United States Patent [19]

Panofsky

[11] 4,445,137

[45] Apr. 24, 1984

[54] DATA MODIFIER APPARATUS AND METHOD FOR MACHINE VISION SYSTEMS

[75] Inventor: Edward F. Panofsky, Woodside, Calif.

[73] Assignee: Machine Intelligence Corporation, Sunnyvale, Calif.

[21] Appl. No.: 301,428

[22] Filed: Sep. 11, 1981

[51] Int. Cl.³ .............................................. H04N 7/18
[52] U.S. Cl. .................................... 358/101; 358/107; 358/903; 382/41
[58] Field of Search ................. 358/93, 107, 101, 133; 364/515; 382/41

[56] References Cited

U.S. PATENT DOCUMENTS 4,216,498 8/1980 Evans et al. ........................ 358/903
4,305,130 12/1981 Kelley et al. ........................ 358/903

*Primary Examiner*—Michael A. Masinick
*Assistant Examiner*—Edward L. Coles

*Attorney, Agent, or Firm*—Flehr, Hohbach, Test, Albritton & Herbert

[57] ABSTRACT

An image data processing system, including a camera for producing a serial image data system corresponding to an array of pixels having a preselected relationship to a scene viewed thereby and producing a separate format signal stream accompanying the image data stream. The system further includes an image data modification system comprising multistage digital delay circuit for separately delaying the image data stream and the accompanying format signal stream in a synchronous manner, a circuit arrangement for withdrawing at least a portion of the image data stream from at least one stage of the delay circuit, a circuit arrangement for processing the withdraw image data stream portion in accordance with a preselected algorithmic function to produce a modified image data stream, and a circuit arrangement for reinserting the modified image data stream into a subsequent stage of the delay circuit. An image utilization device such as an image processing system is coupled to the image data modifier system for utilizing the modified image data stream.

22 Claims, 25 Drawing Figures

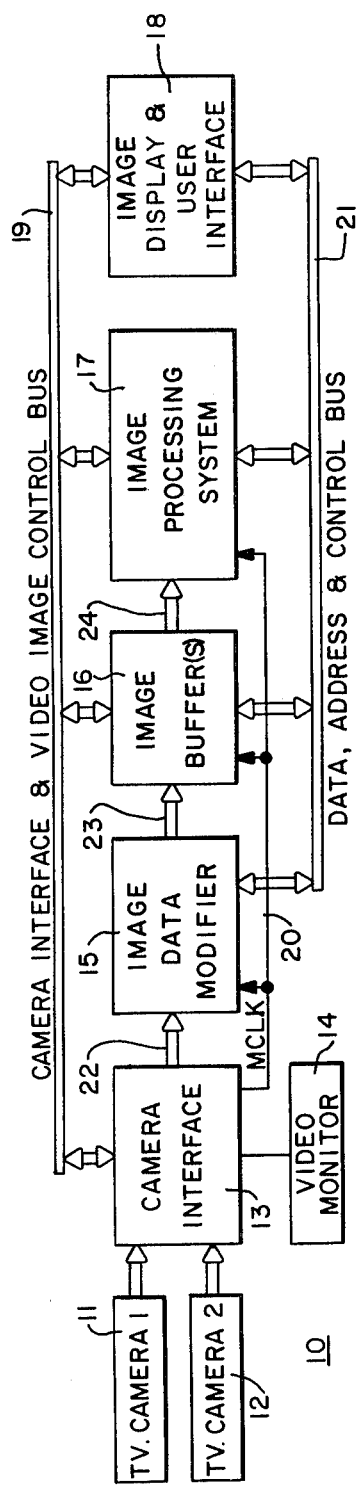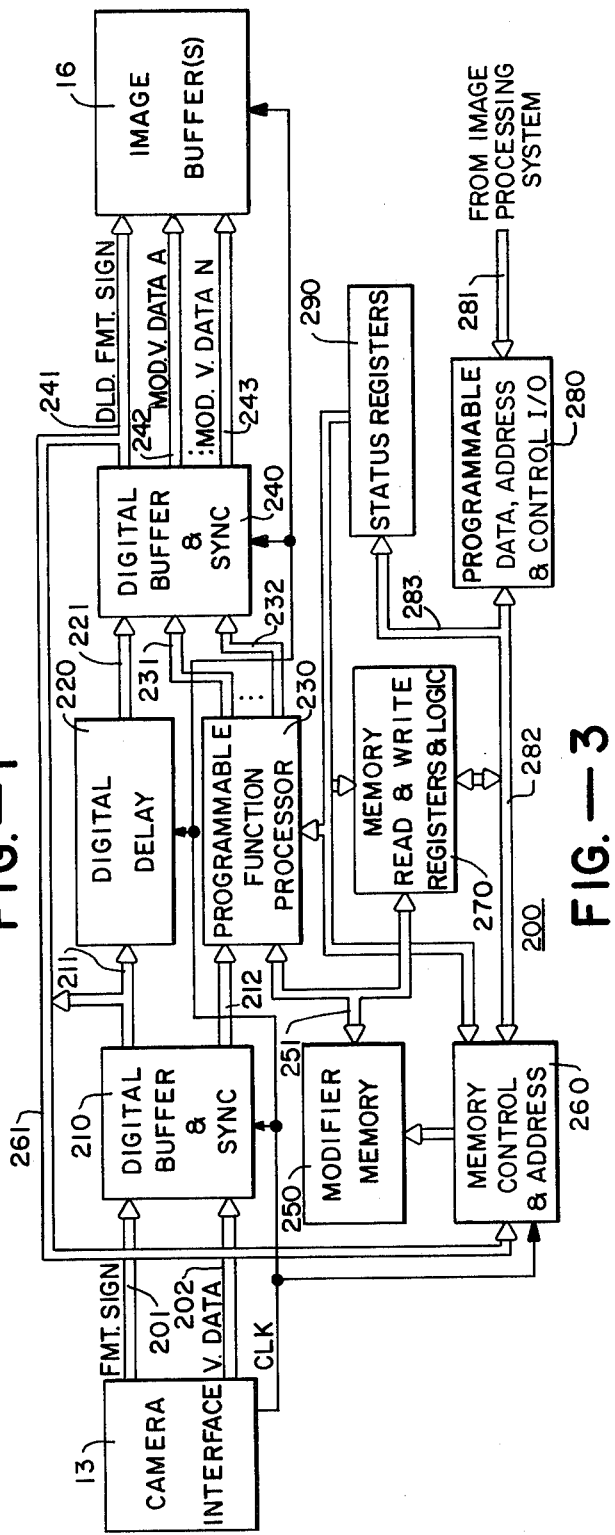
FIG.—1
FIG.—3

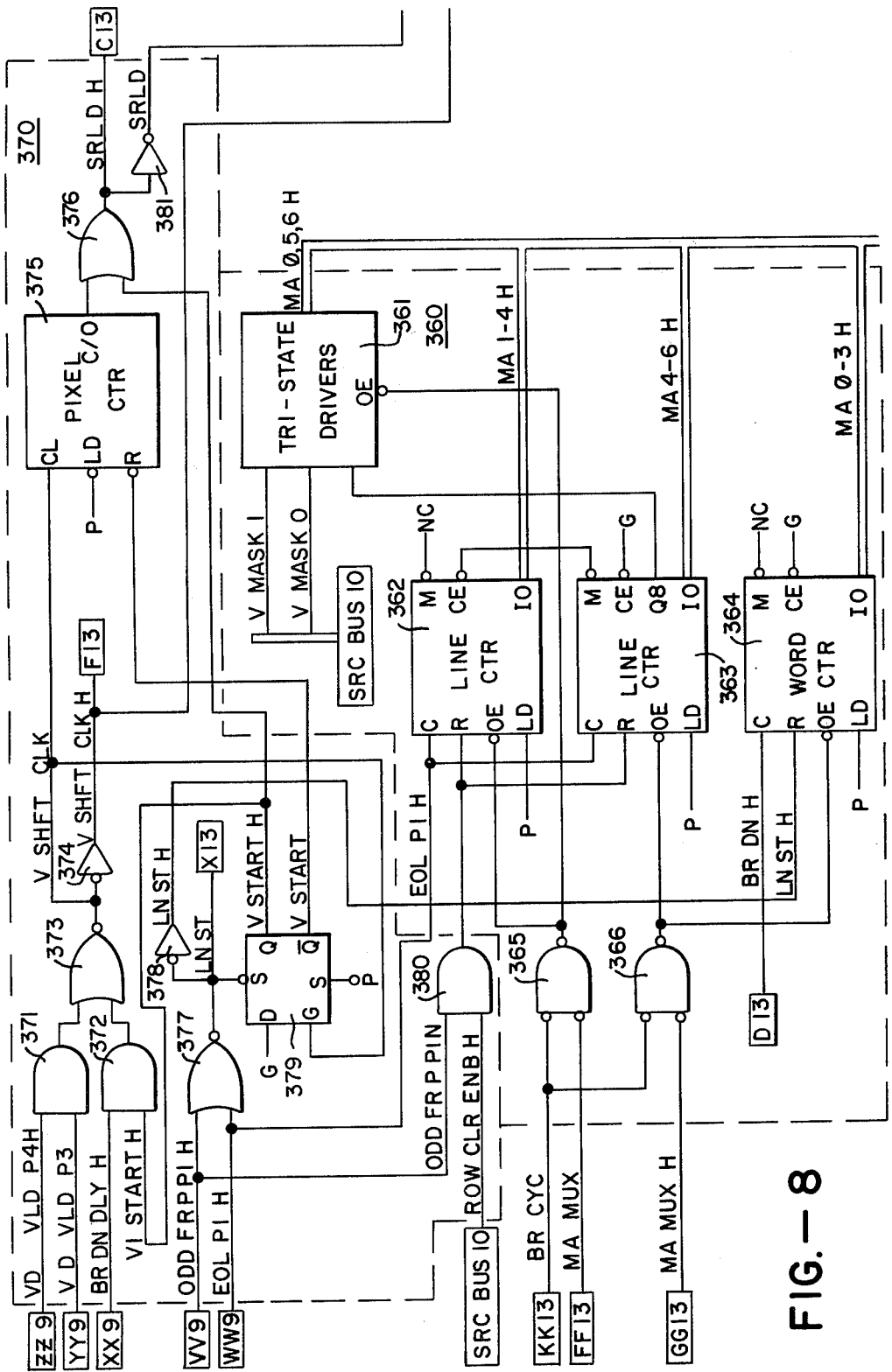
FIG.—8

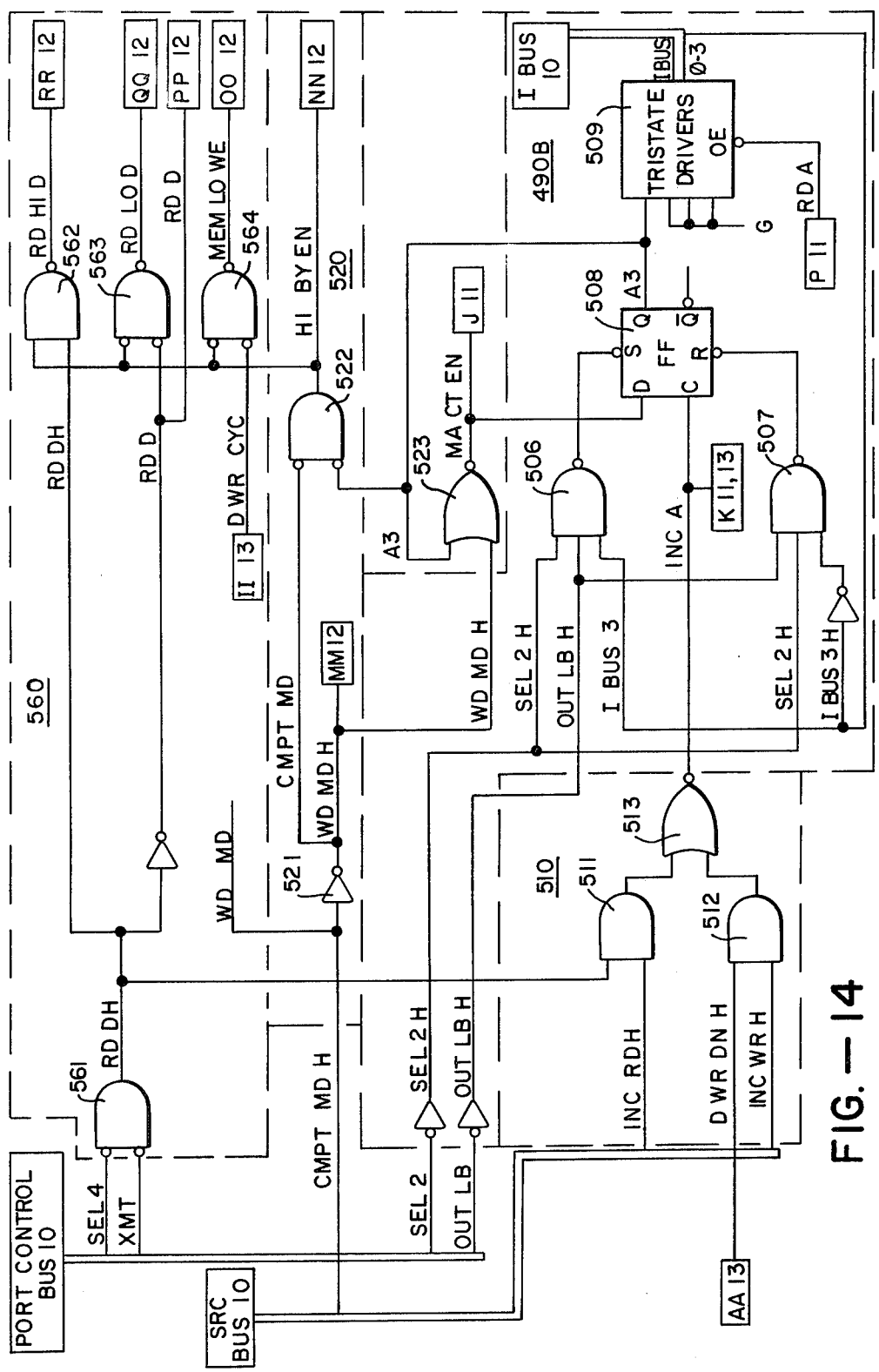
FIG.—14

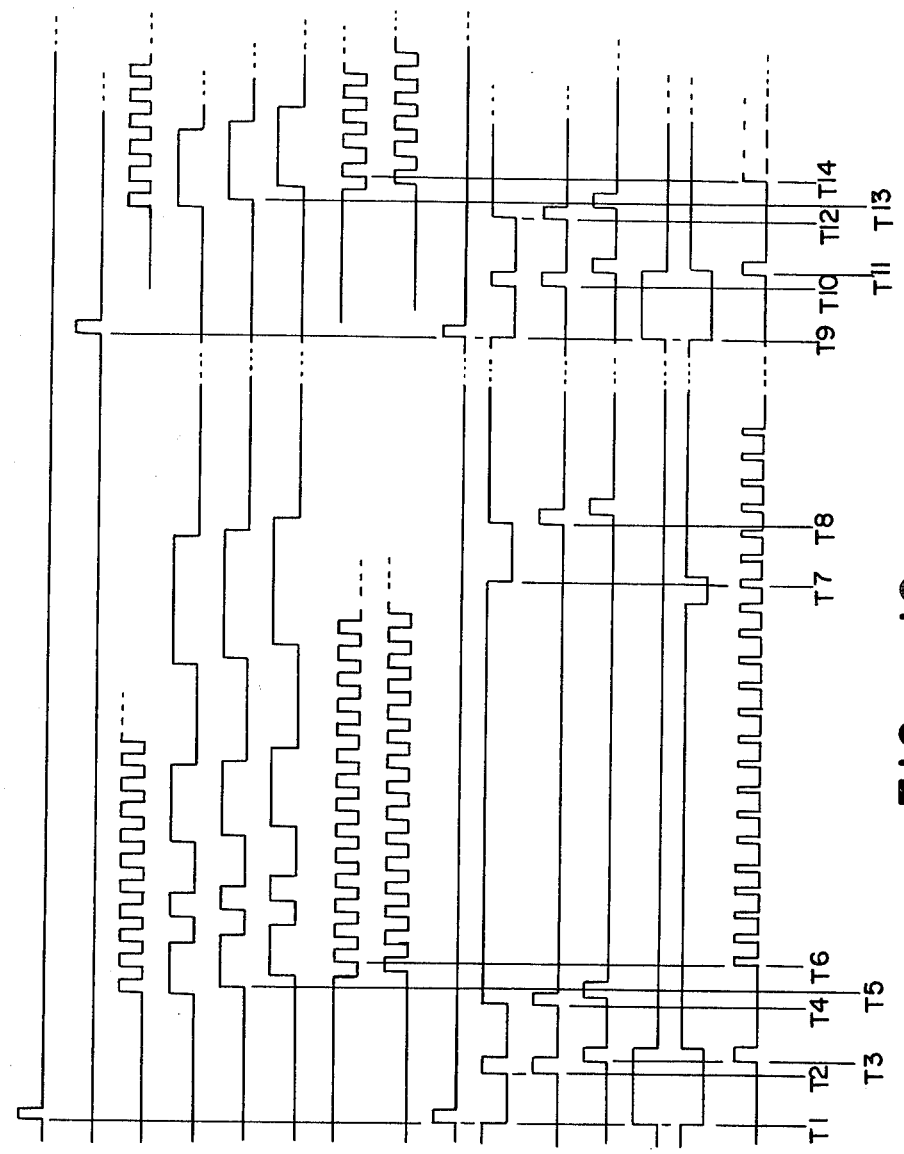
FIG.—16

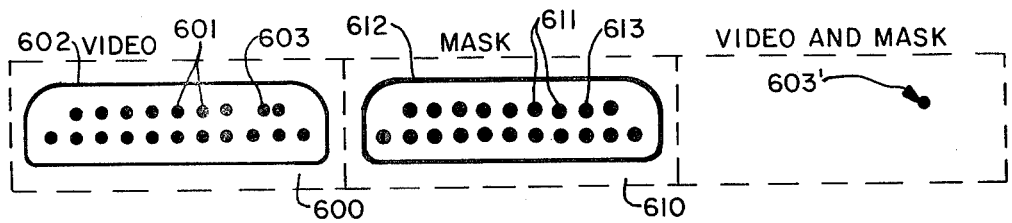
FIG.—17A  FIG.—17B  FIG.—17C
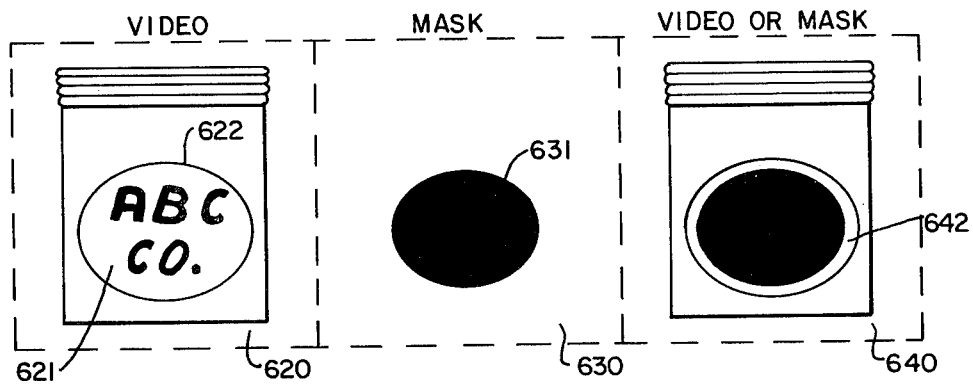
FIG.—18A  FIG.—18B  FIG.—18C
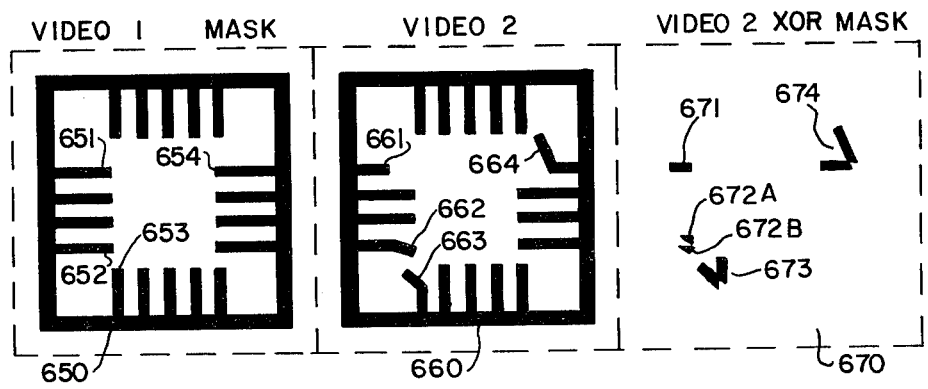
FIG.—19A  FIG.—19B  FIG.—19C

DATA MODIFIER APPARATUS AND METHOD FOR MACHINE VISION SYSTEMS

BACKGROUND OF THE INVENTION

This invention relates generally to machine vision systems and specifically to real time data modifier apparatus and methods for use in machine vision systems.

Substantial development work has been performed on applying machine vision to industrial automation such as automated inspection of two dimensional or three dimensional articles. In general, machine vision systems currently available operate by thresholding a grey scale video camera pixel data stream into a binary data stream and then storing one frame of binary video data in an image buffer. The stored binary image is then processed in an image processing system, usually by first subjecting the stored image data to runlength encoding for data compression and then processing in hardware or software processing systems the run-length encoded data in accordance with a plurality of image analysis algorithms. This image processing step is utilized to extract essential features of the image such as area, perimeter, center of gravity, number of image blobs, image blob location, size, etc.

The speed at which a machine vision system can perform a preprogrammed automated part inspection task is highly dependent on the complexity of the image data which must be processed and the number of image features which must be extracted from the image data for comparison purposes to achieve a statistically reliable decision on acceptance or rejection of the part. The application of machine vision systems to inspection of structurally complex parts is often not commercially attractive because of long image processing time. The use of machine vision in other applications such as, for example, visual servoing of robot manipulator limbs for part insertion or part orientation has also been impeded by the long image processing time required to analyze a complex scene.

SUMMARY OF THE INVENTION

Accordingly, it is a principal object of this invention to provide an improved machine vision system.

It is another object of this invention to provide a real time data modifier apparatus and method for enhancing vision system image data.

It is another object of this invention to provide a real time data modification apparatus and method for establishing data acceptance windows of arbitrary shape and complexity in a machine vision system.

It is another object of this invention to provide real time data modifier apparatus and methods for reducing image data processing time in a machine vision system for automated part inspection.

In accordance with one aspect of this invention the above-stated objects are achieved in an image data processing system which includes an imaging means for producing a serial image data stream corresponding to an array of picture elements or pixels having a preselected relationship to a scene viewed thereby and producing a separate format signal stream accompanying the image data stream. An image data modification means is provided and includes multistage digital delay means for separately delaying the image data stream and the accompanying format signal stream in a synchronous manner. The image data modification means further includes function processor means coupled to the delay means for withdrawing at least a portion of the image data stream from at least one stage thereof, for processing the withdrawn image data stream portion in accordance with a preselected algorithmic function to produce a modified image data stream, and for reinserting the modified image data stream into a subsequent stage of the delay means. Image utilization means is provided at the output of the image data modifier means for utilizing the modified image data stream.

In one embodiment the function processor means in the image data modification means comprises a function processor receiving the withdrawn image data stream and being adapted to process that data stream together with at least a second data stream in accordance with a preselected algorithm to produce the modified image data stream. The function processor means further includes a modifier data source for supplying a modifier data stream to the function processor in synchronism with the image data stream.

The system of this invention can be applied in a system where the imaging means produces an image data stream comprising successive data words of bit length n, each corresponding to an image pixel, by utilizing a modifier data source comprising memory means storing a plurality of preselected modifier data words each associated with one of the image data words together with means for reading modifier data words out of the memory means and presenting the modifier data words to the function processor in synchronism with the arrival of associated video data words. Where the bit length $n=1$, i.e. a binary (black and white) image data stream, the memory means forming the modifier data source may comprise random access memory and the reading and presenting means for presenting modifier data bits to said function processor may comprise buffer storage means coupled to the memory means for receiving and storing a word of modifier data together with a shift register coupled to the buffer storage means for receiving a modifier data word therefrom and communicating successive bits of the modifier data word to the function processor one at a time. Address circuit means are also provided for addressing the memory to read out a word therefrom into the buffer storage means. A control circuit mans is provided to receive at least one format signal from the format signal stream for controlling the address circuit means, the buffer register means and the shift register means to present successive modifier data bits to the function processor in synchronism with corresponding bits of the image data streams presented thereto.

When applied to a system where the bit length n of the image data words is greater than one, a function processor may be utilized which is adapted to process first and second data streams comprising successive n and m bit words. In this case the memory means may comprise m random access memory means each storing one bit of each m bit modifier data word in the modifier data stream. The reading and presenting means may then comprise a separate buffer storage means coupled to each of the random access memory means for receiving and storing a word of modifier data therefrom along with a separate shift register coupled to each of the buffer storage means for receiving a word of modifier data therefrom and for communicating successive bits of that word to the function processor one at a time. Address circuit means is provided for addressing each of the memories simultaneously to read out a word therefrom into associated buffer storage, and control circuit means receiving at least one format signal is provided for controlling the address circuit means, each of the buffer register means, and each of the shift register means to present successive modifier data words to the function processor in synchronism with corresponding data words of the image data stream.

The function processor may comprise a one-function processor or, in accordance with one aspect of this invention, the function processor may be a programmable function processor adapted to process the image data stream and the modifier data stream in accordance with one of a plurality of selectable algorithms. The system may further include a function select means for selecting one of the algorithms for active implementation by the programmable function processor.

The memory means utilized in this invention may include a plurality of modifier memory data planes each having modifier data corresponding to each pixel in the video data stream. In this case the address circuit means includes at least one settable memory level register for supplying at least one selectable memory address bit to the memory means for selecting one of said modifier memory data planes to be read out from the memory means and presented to the function processor.

In accordance with another aspect of this invention, the above-stated objects are achieved in a method for real time processing of a serial image data stream comprising an array of pixels and having an accompanying separate format signal stream. The method includes the steps of separately delaying in a plurality of stages the image data stream and the format signal stream in a synchronous manner. At least a portion of the image data stream is withdrawn from at least one of the digital delay stages and the withdrawn image data stream is processed according to a preselected algorithmic function to produce a modified image data stream. Thereafter, the modified image data stream is reinserted into a data signal path in parallel with and synchronous to the associated delayed format signals.

In accordance with another aspect of this invention a method for such real time processing of serial image data is provided and also includes separately delaying in multiple stages the image data stream and the accompanying format signal stream in a synchronized manner, followed by withdrawing at least a portion of the image data stream from at least one of the delay stages. However, the process includes deriving a modifier data stream time-synchronized with the video data stream and then processing the withdrawn image data stream and the modifier image data stream according to a preselected algorithmic function to produce a modified image data stream. Thereafter the modified image data stream is reinserted into a data signal path in parallel with and synchronous to the associated delayed format signals.

The advantage of this invention in general is that it enables real time image data modification which can enhance the image data in one of several respects. In a vision system utilizing binary video data and applied to an object inspection system, the image data modifier concept of this invention can be utilized to greatly simplify the video data based on prior knowledge of the object being inspected and its features. For example, irregularly shaped complex areas of an image which are immaterial to the inspection task can be windowed out of the image data using this invention. This will produce a substantial increase in the speed of image processing because the image processing system does not "see" and thus does not have to analyze the complex image area which has been windowed out. Increases in image processing time translate directly to increases in throughput of the overall inspection operation. As an example, in an inspection task involving detecting the presence and proper alignment of a label on a jar or bottle, the lettering within the label represents a complex aspect of the overall image and processing that complex aspect of the overall image takes substantial time. However, the lettering is immaterial to the inspection task. This invention enables the windowing out of the lettering area of the label so that only the outline of the label, if present, is processed as image data. This radically speeds up the image processing and thus radically decreases the time required for inspecting each object.

In another inspection environment, it is necessary to determine whether the position of individual features of a part are within a particular tolerance zone. Utilizing the system and method of this invention a tolerance mask can be stored representing the acceptable geometric tolerance zone for each feature of the object. The functional logic processing of the video image data by ANDing with the inverse of stored mask data produces an empty image area except for pixels in the video data which fall outside the tolerance zones in the stored mask data. This approach may enable part inspection for accept/reject criteria without doing any complex image processing. Instead it may be possible simply to accept or reject the viewed part based on whether or not the modified video data stream contains any or a substantial number of logic ONE data bits corresponding to black pixels. It should be understood that any convention could be used for relating binary logic values ONE and ZERO to black or white pixels, i.e., a ONE could equal a black pixel or a white pixel.

This invention can also be applied advantageously in inspecting highly complex fixtured objects for a relatively exact match-up with the image of a normal object. In this case the modifier memory plane used for real time function processing is an image of the normal object. Utilizing the XOR function in the function processor, the modified video data stream will contain black pixels only where there is a difference in the logic value for a video data bit and a corresponding modifier data bit. The image of this modified video data can be quickly analyzed to determine whether the level of difference is sufficient to require a rejection of the part.

Specific examples of the application of this invention will be discussed in the following detailed description of the invention. In general, it should be understood that the system and method of this invention substantially extends the capabilities of existing vision system technology and appears likely to increase the number of commercially attractive applications of vision systems. Improving image processing speed increases inspection throughput which is a large factor in the cost/benefit ratio of applying machine vision to automated part inspection. Furthermore, the general concepts of this invention may hasten the application of the use of grey scale image data processing in machine vision applications. A number of grey scale data modifications can be made at the video data bit rate and consequently substantial video data enhancement may be accomplished on grey scale images.

BRIEF DESCRIPTION OF THE DRAWING

Other objects, features and advantages of this invention will be apparent from a consideration of the following detailed description taken in conjunction with the accompanying drawings.

FIG. 1 is a general block diagram of a vision system illustrating the system location of an image data modifier apparatus in accordance with this invention.

FIG. 3 is a block schematic diagram of another version of an image data modifier system in accordance with this invention.

FIGS. 8–14 together illustrate a detailed overall system block diagram of one embodiment of a data modifier apparatus in accordance with this invention.

FIG. 16 is a signal timing diagram illustrating the operation of one aspect of the data modifier apparatus depicted in FIGS. 8–14.

FIGS. 17–19 illustrate exemplary applications of the image data modifier apparatus and method of this invention.

DESCRIPTION OF THE PREFERRED EMBODIMENT(S)

Figure 2:
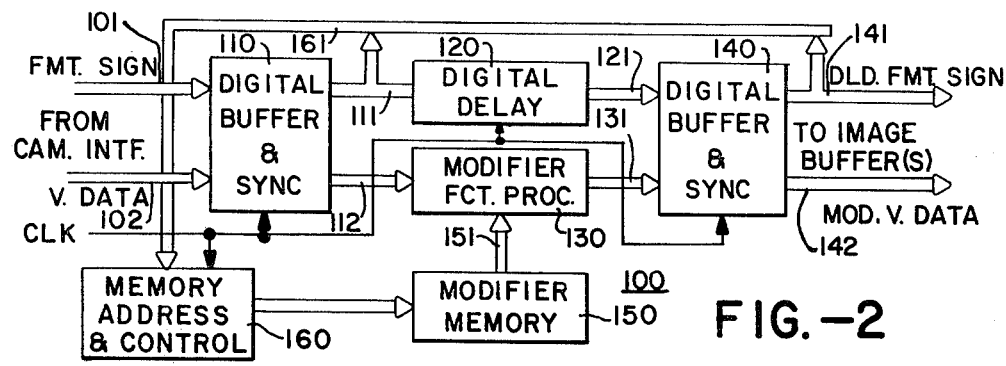
FIG. 2 is a block schematic diagram of one version of an image data modifier system in accordance with this invention.

Referring now to FIG. 1, the general placement of an image data modifier apparatus in accordance with this invention within a vision system is illustrated. As shown, image data modifier 15 is located between camera interface circuitry 13 and image buffers 16 in the vision system 10. The overall structure of the vision system 10 depicted in FIG. 1 is the particular structure utilized in a VS-100 Machine Vision System available from Machine Intelligence Corporation of Palo Alto, Calif. However, it should be understood that the image data modifier of this invention can be applied in virtually any machine vision system and would generally be located between a camera interface which has video data and separate format signal outputs and an image buffer or image storage means provided in the machine vision system. As shown in FIG. 1, one or more TV cameras 11 and 12 may be hooked up to camera interface 13. The primary function of camera interface 13 is to select data from one of the cameras to be utilized and to output format and video data corresponding to the selected camera on the output bus 22. In The VS-100 system, the camera interface circuit thresholds the grey scale data and outputs a binary video data stream on one of the signal lines in output bus 22 to image data modifier 15.

It should be understood, however, that the image data modifier system of this invention can also be utilized in future machine vision systems which will perform grey scale image processing. In that type of system the output of camera interface 13 would constitute a multibit word for each pixel of image data. This invention will be described generally in terms of both binary and grey scale video data systems and the structure and function of an image data modifier which would be employed in each instance.

Image data modifier 15 acts separately on the format signal information coming in thereto and on the video data stream communicated thereto. In general, as will be seen in more detail below, the format signals received by the image data modifier are delayed through various digital delay stages and appear at the output of the image data modifier without alteration but at a time delayed a predetermined amount. The video data input to image data modifier is also sent through one or more stages of digital delay for purposes of assuring synchronization with the delayed format signal but the video data is withdrawn from the digital delay stages at one or more locations for purposes of operating on the data, one pixel at a time, in accordance with a predetermined function to produce a modified video data stream. This modified video data stream is then reinserted into the digital delay path of the signals progressing through the multistage digital delay arrangement within the data modifier circuitry. This reinsertion is accomplished at an appropriate delay stage so that the modified video data stream is output from image data modifier 15 parallel to and in synchronism with the delayed format signals associated therewith.

The output signals from image data modifier 15 on bus 23 are comunicated to image buffer circuitry 16 where the modified image data is stored in one or more buffer memory arrangements. It is within the purview of this invention that several parallel or serial data modification functions may be performed on a video data stream input into image data modifier 15 and more than one modified video data stream may be output from image data modifier 15 and stored in separate image buffers. After a modified data image is stored in image buffer 16, the stored image data is read into an image processing system 17 over an output bus arrangement 24. In general image processing system 17 will first put the image data through one type of data compression technique such as run-length encoding and then the encoded data will be processed in a hardware or software or combined hardware/software processing system in accordance with a plurality of image analysis algorithms to extract essential features of the image. As will be discussed in detail below, in some instances the image processing algorithms which are applied to the withdrawn data from image buffers 16 may be very simple algorithms which can be very quickly processed in order to reach an accept/reject decision when the system of this invention is applied to object inspection. It may also be possible in some applications to dispense with storing a modified image in an image buffer and instead to process the modified video data as it arrives.

As shown in FIG. 1, the camera interface circuitry 13, the image buffer 16, the image processing system 17 and the image display user interface circuitry 18 are tied together by way of a camera interface and video image control bus 19. In general, this control bus is utilized to route video image information and control signals to control a number of operations of the interconnected circuitry. For example, the bus controls the routing of analog and stored digital video data to a video monitor 14. An image display and user interface circuit 18 generally represents one of a variety of approaches that can be taken to provide user control over the displayed image and user selected inputs into the image processing system 17 via data, address and control bus 21. The data, address and control bus 21 provides two-way communication between image processing system 17 and image data modifier 15. As will later be seen some simplified versions of this invention do not require this communication.

FIG. 2 shows the functional circuit blocks of one embodiment of an image data modifier in accordance with this invention. Separate input busses 101 and 102 communicate format signals and video data signals, respectively, from the camera interface circuitry. The signals on these two separate busses are received by digital buffer and sync circuitry 110 which separately buffer the signals in a digital delay-type storage means. Output bus 111 communicates delayed format signals to a digital delay circuit 120 in which the format signals are again delayed for a predetermined period of time before they are communicated to output bus 121.

The delayed video data signals appear at the output of digital buffer and sync circuit 110 on bus 112 and are fed to modifier function logic circuit 130. The output of modifier function processor circuit 130 on bus 131 represents a modified video data stream which is received by digital buffer and sync circuit 140. Digital buffer and sync circuit 140 separately delays and synchronizes the delayed format signals on bus 121 and the modified video data signals on bus 131. Output bus 141 has delayed format signals thereon and output bus 142 has delayed modified video data signals thereon. Digital delay circuit 120 delays the format signals for substantially the same period of time that the modifier function processor 130 takes to perform its operations on the video data. Consequently, the delayed format signals on bus 121 and the modified video data signals on bus 31 will be substantially synchronized with each other. The digital buffer and sync circuit 140 operates to further assure that the delayed format signals on bus 141 and the modified video data signals on bus 142 are synchronized for input to image buffers.

Modifier function processor 130 operates on delayed video data on bus 112 and modifier data output from a modifier memory 150 on a bus 151. To control the presentation of data from modifier memory 150 to modifier function processor 130, a memory address and control circuit 160 is provided. Memory address and control circuit 160 utilizes delayed format signals fed back over a bus 161 to control the addressing of modifier memory 150 so that the modifier memory data presented to the modifier function logic circuit 130 corresponds to an associated image data pixel concurrently presented to the modifier function processor. The modifier memory 150 together with the memory address and control circuit 160 constitute a source of modifier data input to the function circuit 130 in synchronism with corresponding delayed video data signals on bus 112.

FIG. 2 exemplifies a simple version of an image data modifier system in accordance with this invention in which the modifier memory 150 is prewritten to have a fixed data structure appropriate to a dedicated machine vision task. In this case, modifier memory 150 could be a read only memory (ROM) having a built-in modifier data structure. Alternatively, modifier memory 150 could be a programmable ROM so that the data structure could be altered to a form appropriate to a different machine vision task.

FIG. 3 represents a more sophisticated implementation of this invention utilizing a programmable function processor 230 and including a modifier memory read and write arrangement which is controlled by a central processor unit (CPU) in the image processing computer system by way of programmable data, address and control I/O circuitry 280. In this embodiment the digital buffer and sync circuit 210, the digital delay circuit 220, and the digital buffer and sync circuit 240 function substantially in the same fashion as corresponding circuits in the FIG. 2 embodiment. Consequently, the description of that operation need not be repeated here.

The system depicted in FIG. 3 includes memory read and write registers and logic 270, by means of which the CPU in the image processing system can write new data into modifier memory 250 and can read data from modifier memory 250 to verify the data structure stored therein. In addition the CPU can control the selection of the function or functions to be implemented by programmable function processor 230 by way of function control signals communicated over a status register control bus from status registers 290 loaded from programmable I/O port 280 via bus 282. Utilizing the status registers 290, sophisticated control over the functions to be implemented by programmable function processor 230 together with control over the active one of several modifier memory planes in memory 250 can be accomplished. Also, time shared CPU controlled reading and writing of data from one or more memory planes within memory 250 may be accomplished while the memory 250 is not actively servicing data requirements of the function processor 230. An implementation of this sophisticated system is shown in FIGS. 8–14 and will be described in detail below.

As shown in FIG. 3, programmable function processor 230 may be arranged to process video data from input bus 212 in accordance with plural functions output two or more separate modified data streams on parallel output busses, for example busses 231 and 232. In this case the buffer and sync circuit 240 must contain digital delay circuit capability for each of the modified data streams, and will correspondingly have at least two modified video data output busses 242 and 243. In addition to processing a video data stream in accordance with several functions in parallel, it should be apparent that the system of this invention could readily be adapted to a tandem arrangement of function processors wherein the original video data stream is first modified in accordance with one function and the output modified video data stream is then fed to one or more additional function processors for further data modification. Such tandem function processor arrangements can be achieved by duplicating those portions of the circuitry shown in FIG. 3 which are required for support of each function processor.

Figures 4, 5:
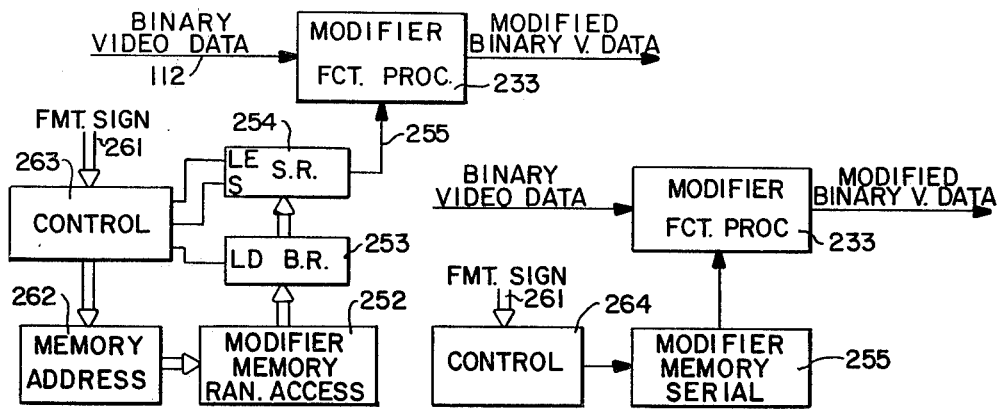
FIGS. 4 and 5 are block schematic diagrams of a portion of an image data modifier system in accordance with this invention applied to binary video data.

FIG. 4 illustrates one approach to addressing and controlling a modifier memory where the modifier memory is a random access memory and the modifier function processor 233 is operating on binary video data. The arrangement shown in FIG. 4 involves reading out data from modifier memory 252 one word at a time into a buffer register 253. The data contents of buffer register 253 are loaded into a shift register 254 and shift register 254 is controlled to present modifier data bits one at a time to modifier function processor 233 over data line 255. The memory address circuitry 262 and the control circuitry 263 together operate to provide a controlled sequence of changing the memory address supplied to the modifier memory 252, loading of data at that memory address into buffer register 253, loading of data from buffer register 253 into shift register 254 and shifting of individual data bits out of shift register 254 into modifier function processor 233. This control operation is synchronized by format signals received over bus 261 so that the modifier data bits presented to modifier function processor 233 arrive in synchronism with associated video data bits arriving at modifier function processor 233 on line 112. The implementation of specific control circuit and memory address circuit will be described in detail in conjunction with FIGS. 8–14.

FIG. 5 illustrates an alternative implementation utilizing a serial modifier memory 255 to present individual data bits to modifier function processor 233 in synchronism with corresponding bits of video data. Serial memories such as fast CCD memories could be employed in this invention with direct coupling of the memory output to the modifier function logic. Control of the serial memory by a control circuit 264 would generally involve utilizing format signals fed back over 261 to synchronize the read out of serial memory bits with the corresponding binary video data. The specific implementation of a serial memory and control approach as shown in FIG. 5 is well within the skill of the average logic designer and need not be set forth in detail in this specification. The integration of a serial memory approach into an overall computer-controlled read and write system of the type depicted in FIG. 3 is also well within the skill of the average circuit designer. Such an implementation, however, would require that the writing and reading of the serial memory under CPU control would have to take place during time periods when the memory is not occupied in feeding modifier data to the modifier function processor 230.

Figures 6, 7, 15:
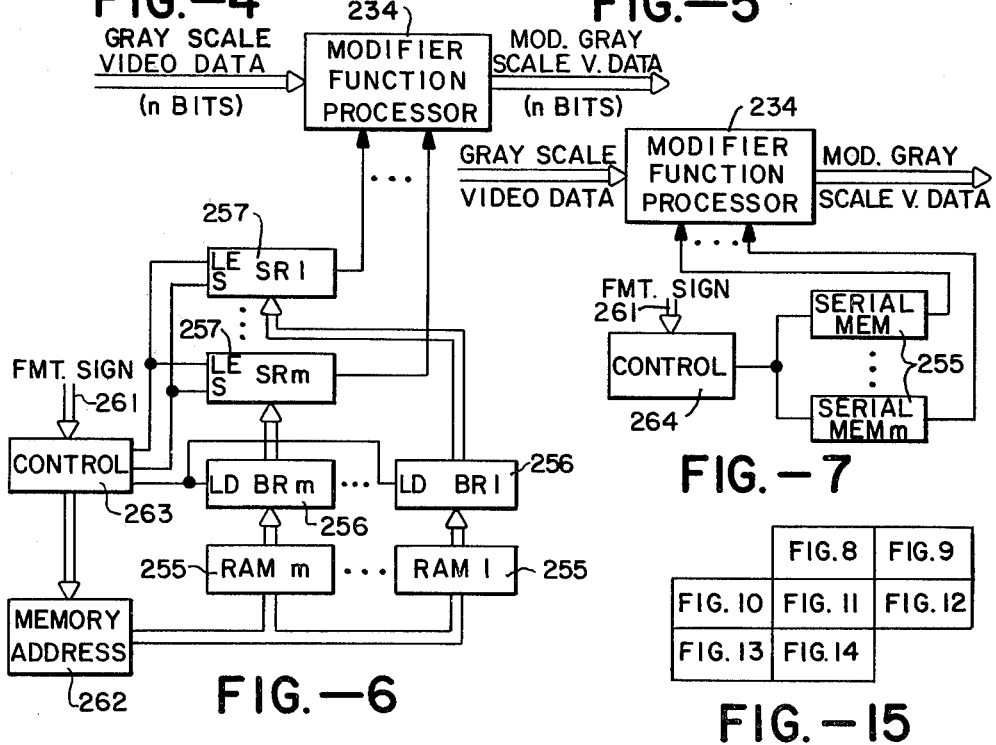
FIGS. 6 and 7 are block schematic diagrams of a portion of an image data modifier system in accordance with this invention applied to grey scale video data.
FIG. 15 depicts the manner in which sheets of FIGS. 8–14 fit together into an overall system diagram.

FIG. 6 illustrates an extension of the implementation for binary video data depicted in FIG. 4 to grey scale video data. In the system in FIG. 6, m bits of modifier data are presented to modifier function processor 234 by way of an arrangement of buffer registers and shift registers communicating with separate random access memories 255. In this case, a parallel arrangement of buffer registers 256 is employed, one for the output of each random access memory. A corresponding array of shift registers 257 is provided for shifting individual bits of the m bit word into the modifier function processor 234. The memory address circuitry 262 and control circuitry 263 do not require any change. The memory address and control outputs thereof are supplied to the parallel arrangement of memories, buffer registers, and shift registers in common.

FIG. 7 illustrates the use of serial memories in a grey scale video data embodiment of this invention. In this case plural serial memories 255 are employed, each communicating one bit of the m bit modifier data word to the modifier function processor 234. The control circuitry 264 for the multibit grey scale embodiment may be the same as that for the single bit embodiment shown in FIG. 5. The number of modifier data bits may be the same as the number of bits in each grey scale video data word, but in some instances it may be practicable to use fewer or more modifier data bits.

Modifier function processor 234 may comprise a static logic circuit which simply compares values of the video data words and the modifier data words in accordance with a prearranged logic function, or it may comprise a sophisticated fast arithmetic processor capable of performing one of a number of arithmetic operations on the video and modifier data words presented thereto. Some of the functions which the modifier function processor might implement are the following:

1. addition of the two input words;
2. subtraction of one of the input words from the other;
3. dividing one input word by the other;
4. multiplying one input word by the other;
5. outputting the word having the greater value;
6. outputting the word having the smaller value.

Functions 1–4 could be used to correct for non-uniform lighting of the scene viewed by the camera or for spatial non-uniformities in camera sensor response. They could also be used to compare two images. Functions 5 and 6 could be used to limit grey level range in a preselected image region.

In addition the modifier function processor 234 may perform simple compare operations on the two video words to produce a single data bit output indicating by its value whether one selected word is greater or less than the other or simply indicating whether the two words are equal or not equal or almost equal within a specified number of quantization levels. These functions could be used to generate a binary image with position varying threshold or to compare two images to locate differences. In summary, any arithmetic or logic function can be performed on the two input signals and can be implemented in this invention provided the modifier function processor can be operated at the frequency of the video data and the input modifier data.

Figure 9:
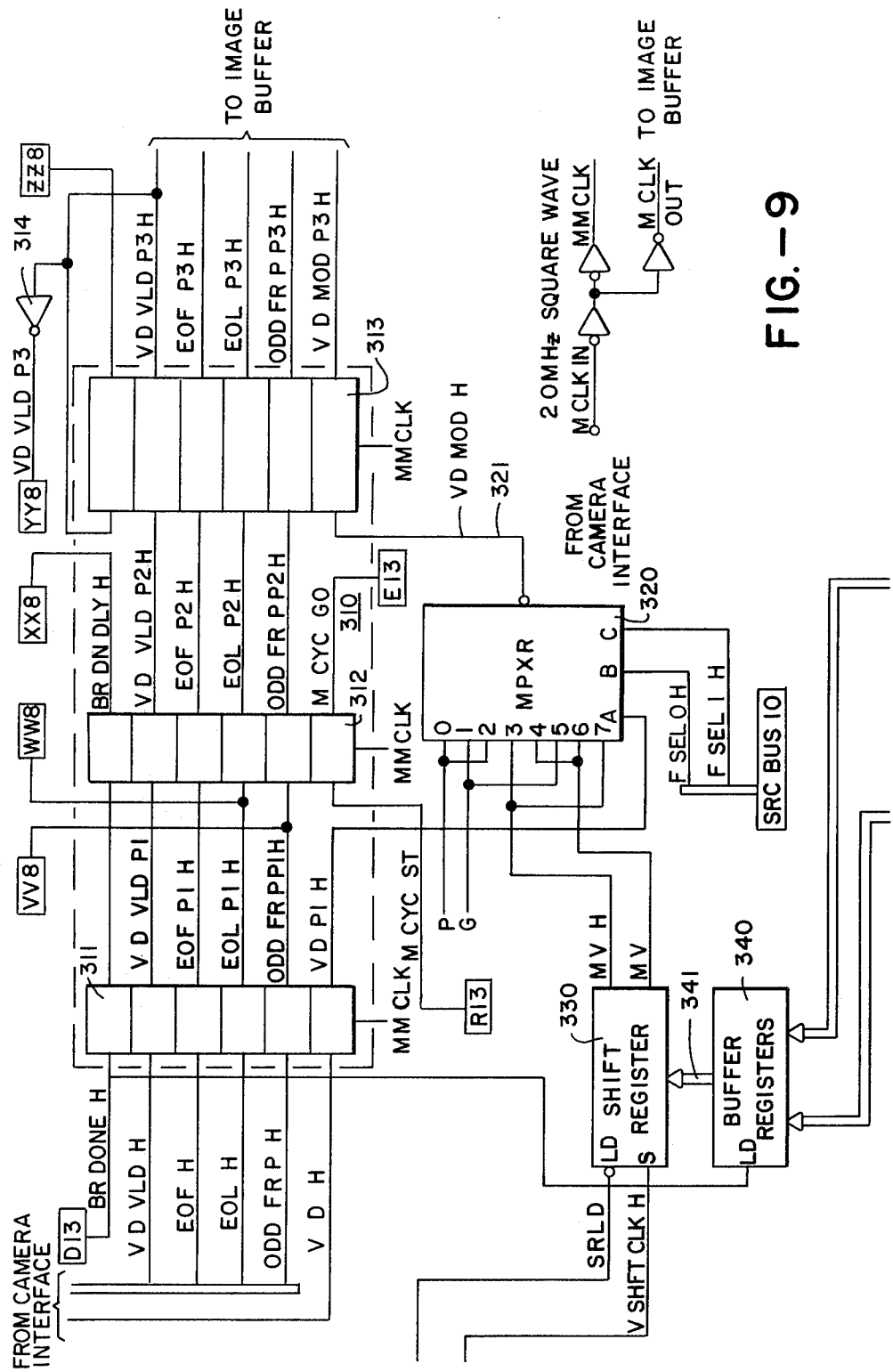

Referring now to FIGS. 8–14, a detailed description of one embodiment of an image data modifier system in accordance with this invention will be described. Referring first to FIG. 9, it will be seen that this embodiment processes a binary video data stream arriving from the camera interface along with four separate format signals. The four separate format signals constitute video data valid signal, designated V D VLD H, an end of frame signal designated EOF H, an end of line signal, designated EOL H, and a frame start signal designated ODD FR P H. Throughout the drawings and description, H at the end of a logic signal designation will be utilized to indicate a HIGH TRUE signal level. Signal designations not ending in H will have LOW TRUE signal levels.

As shown in FIG. 9, the video data signal V D H from the camera interface and the four format signals are fed through a multistage digital delay arrangement 310. The V D H signal and the four format signals are synchronized in a first delay stage 311. The delayed video data signal V D PL H is withdrawn from the output of the first delay stage 311 and routed to the programmable function generator 320 which in this embodiment is a special programmable function logic arrangement implemented in a digital multiplexer circuit.

This programmable function processor arrangement will be described in detail below. The four format signals from the first delay stage 311 are fed to a second delay stage 312 and from there to a third delay stage 313. It will be noted that the delay stages 311, 312, and 313 also are utilized to provide delayed versions of certain logic signals which are employed in other sections of the system. This is done simply for conservative use of integrated circuit components and these delay functions could be performed locally to the logic circuitry utilizing the delayed signals. The modified video data output V D MOD H at the output of the programmable function generator 320 is reinserted into the third delay stage 313 to be synchronized with the format signals which have passed through two delay stages. The output of the third delay stage 313 provides the synchronized format and modified video data signals to the image buffer.

Figure 12:
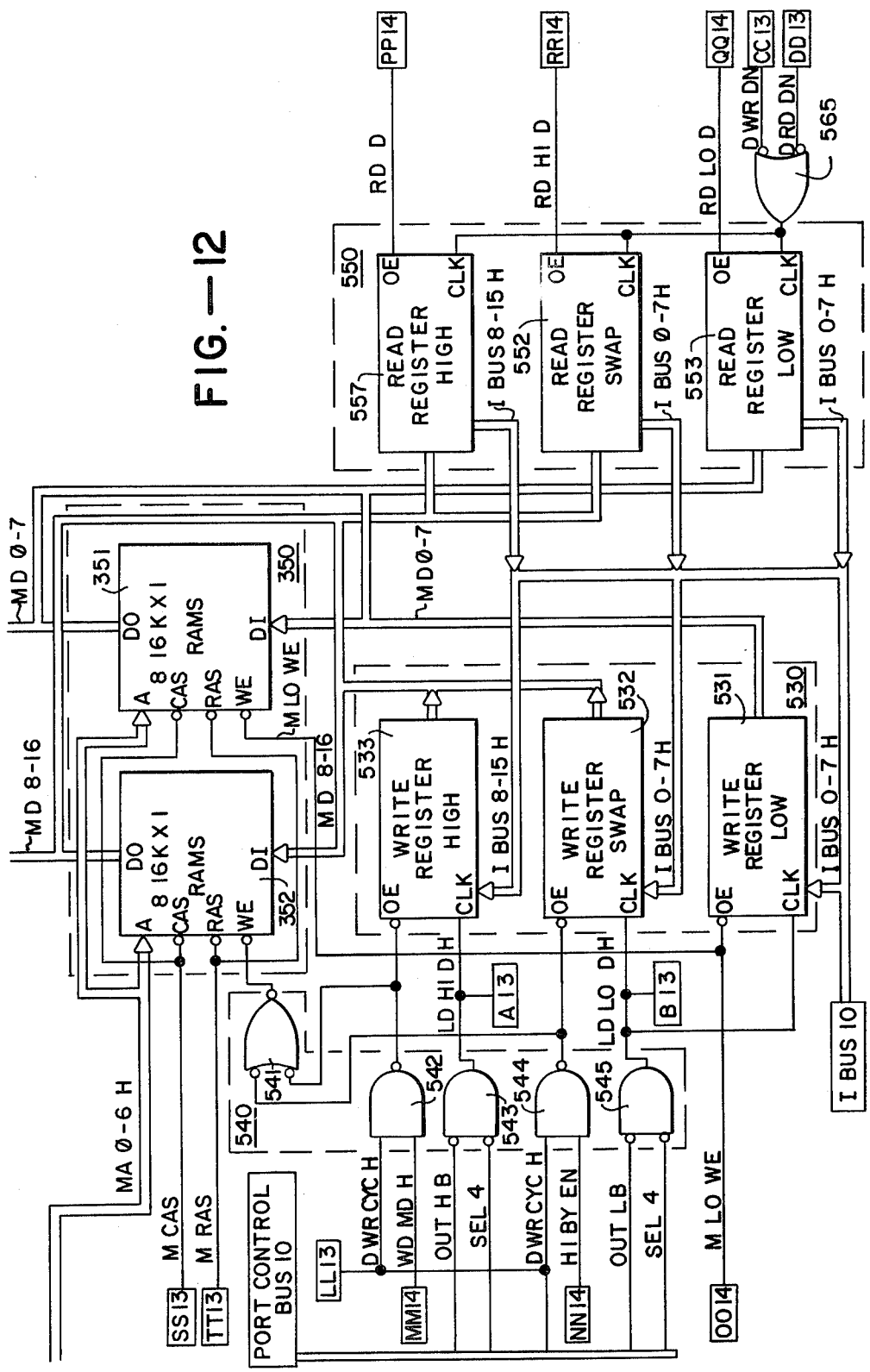

Referring to FIG. 12, modifier memory 350 is shown implemented in the form of two memory sections 351 and 352 each containing eight sixteen kilobit dynamic RAMs each organized as a 16K by one bit memory. Each of the eight RAMs in each section outputs eight bits of data with the outputs from RAM section 351 being memory data lines MD0-7 and the outputs from memory section 352 being memory data lines MD8-16. The two separate memory data busses MD0-7 and MD8-16 feed two eight bit buffer registers in buffer register circuit 340. The sixteen bit output of buffer registers 340 is communicated over a bus 341 to shift register 330.

Figure 13:
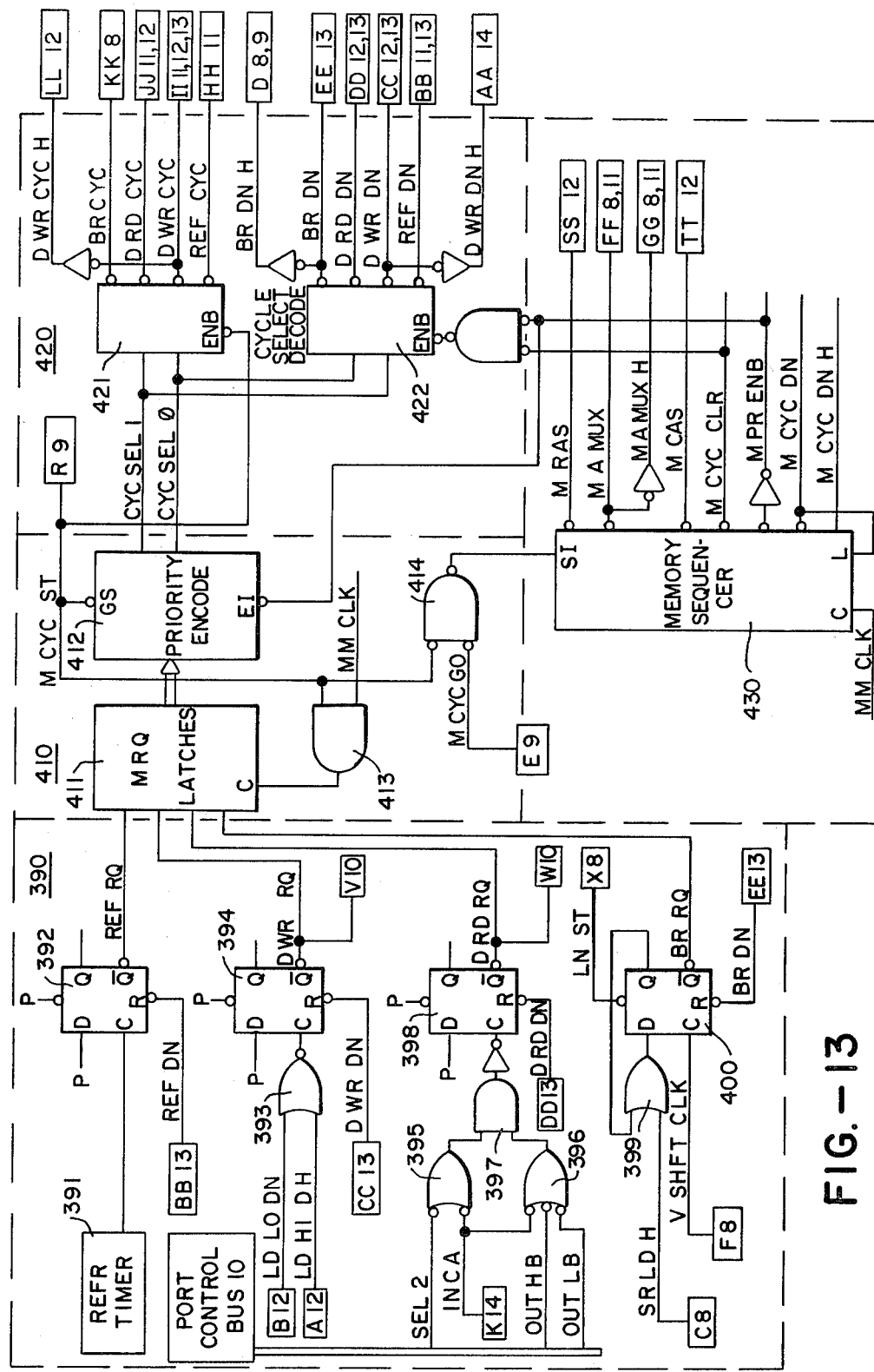

Referring to FIG. 8, the addressing of the modifier memory 350 for purposes of reading data out of the modifier memory into the buffer registers 340 is accomplished in pixel address circuitry 360. Pixel address circuitry 360 includes a word counter 364 and a pair of counters 362 and 363 which serve as a line counter. The highest order address bits for reading modifier data are provided by the V MASK O and V MASK 1 signals on status register control bus, SRC BUS, which will be described later. FIG. 8 also shows the control logic 370 which controls resetting and incrementing of the address counters in pixel addressing circuit 360 and the loading and shifting of shift register 330. Additional control logic providing memory cycle requests for the buffer register 340 is shown in FIG. 13 as part of memory cycle request flip-flop arrangement 390. Request flip-flop arrangement 390 is part of an overall memory cycle request and control arrangement depicted in FIG. 13. This arrangement also includes a memory request latch and priority encode circuit 410, a memory cycle select decode circuit 420 and a memory sequencer circuit 430.

The operation of the pixel address circuitry 360 and the control circuitry 370 can best be understood by considering the timing diagram shown in FIG. 16 which depicts the time sequence of logic operations of the circuitry. The first three diagrams shown in FIG. 16 comprise three of the four format signals received from the camera interface. The frame start signal designated ODD FR P P1H represents the frame start signal after it has passed through the first delay stage 311. The end of line signal EOL P1H also represents the end of line signal after it has passed through the first delay stage. The video data clock V D VLDH signal represents the pixel clock which accompanies the video data which is depicted on the fourth line of the timing diagram designated V D H. The period of each pixel data bit is about 200 nanoseconds and the digital delay in each of the delay stages 311, 312, and 313 is about 50 nanoseconds. Accordingly, the fifth line on the timing diagram designated V D P1H corresponds to the V D H signal delayed by about 50 nanoseconds or about one-fourth of a bit period. Similarly, the sixth line of the timing diagram designated V D P3H represents the video data after the third delay stage shown here as delayed by about 150 nanoseconds or three-fourths of a bit period. The next signal shown is the video data valid clock after the third delay stage designated V D VLD P3. However, this represents the LOW TRUE version of that clock at the output of the inverter 314 shown in FIG. 9. The eighth line of the timing diagram, designated V D VLD P4H, represents the form of the video data valid signal after putting it through a fourth delay stage for a total delay of 200 nanoseconds, As will later be seen the signals on the seventh and eighth lines of the timing diagram are ANDed together to form a video shift clock which has its leading edge coincident with the start of each video data bit out of the first delay stage 311.

As shown in FIG. 9, the ODD FR P P1H signal from the output of the first delay stage 311 is fed along with the EOL P1H signal as an input to gate 377 in pixel control logic 370. At time T1 the ODD FR P P1H signal goes high generating a line start signal LN STH. The ODD FR P P1H signal also is fed to gate 380 and generates a reset signal for line counter 362. The row clear enable signal ROW CLR ENBH from the status register circuitry (FIG. 10) has been set HIGH to enable this operation to occur.

The line start signal LN STH causes a resetting of the word counter 364 and is also fed to the buffer register request flip-flop 400 in FIG. 13 to set that flip-flop and produce a buffer register request BR REQ signal which initiates a memory request cycle for the buffer register. The LN ST signal sets the video start flip-flop 379 to generate a V STARTH signal as shown in FIG. 16. This V STARTH signal is fed through the gate 376 and inverter 381 to provide a shift register load SR LD signal to shift register 330. The V STARTH signal is also fed to gate 372 enabling that gate to respond to a buffer register done delay signal BR DN DLYH which will occur at a delayed interval after the buffer register request memory cycle has been completed. V START resets pixel counter 375 at this time. At some point in time the memory cycle control circuitry shown in FIG. 13 will have completed whatever memory cycle may have been performing at the time the buffer register request generated by LN ST H occurred. At such time a memory cycle start M CYC ST signal is generated at the output of priority encode circuit 412 and on the next master clock pulse into gate 413 all memory requests are latched into the memory request latches 411. Since the buffer register request is given the highest priority in the priority encode circuitry 412, the buffer register request will be serviced and a buffer register memory cycle will be performed. The cycle select signals out of the priority encode circuit 412 will be decoded in cycle select decode circuitry 421 to produce a buffer register cycle BR CYC output signal which is fed to gates 365 and 366 in pixel address circuitry 360 in FIG. 8. This enables the gates 365 and 366 to respond when memory address multiplex signals are received from the memory sequencer circuit 430 in FIG. 13 to cause line counters 362, 363 and word counter 364 to put out address bit on address lines M A O-6.

The memory cycle start signal from M CYC ST priority encode circuit 412 is fed through a 50 nanosecond delay stage in the second delay stage 312 shown in FIG. 9 to produce a memory cycle go MEM CYC GOH signal which initiates the operation of memory sequencer 430. Memory sequencer 430 produces a time sequence of output signals. The first output signal is a memory row address strobe signal M RAS which is fed to the modifier memory 350 in FIG. 12 to instruct the dynamic RAMS to accept the first seven address bits from the pixel address circuitry 360 shown in FIG. 8. A short time later a memory address multiplex signal is produced which is fed to the pixel address circuitry 360 to enable the output of the word counter 364 and the lower half of the line counter 363. These counters put out the seven address bits to the dynamic ram which are latched into the RAM. Thereafter, the memory column address signal M CAS occurs just as the memory address multiplex signal M A MUX is reading out the high order seven address signals from the line counters 362 and 363 and from the tri-state drivers 361. When the dynamic RAMs within modifier memory 350 have received both address signals, they put out valid memory data on memory data busses MD 0-7 and MD 8-16 to the buffer registers 340. Next, the memory cycle clear M CYC CLR and memory priority enable M PR ENB signals occur enabling the cycle select decode circuit 422 to put out a buffer register done BR DN signal. BR DN is fed as an input to the first delay stage 311 in FIG. 9 and is fed as a load signal to buffer register 340. Accordingly, at time T2 in the timing diagram of FIG. 16, when BR DN occurs, the data on the sixteen data lines from the modifier memory 350 is loaded into the buffer registers 340. The BR DN signal also resets the buffer register request flip-flop 400 and increments the word counter 364 indicating that the first word, designated word 0, has been loaded into the buffer registers 340.

About 50 nanoseconds later, at time T3, the buffer register done delay signal BR DN DLYH occurs as shown in FIG. 16. This signal from the output of the second delay stage 312 in FIG. 9 is fed to gate 372 which has been enabled by the V START H signal. Accordingly, a first video shift clock V SHFT CLK signal is generated. V SHFT CLK clocks the pixel counter 375, but this has no effect because V STRT is holding it reset. V SHFT CLK is also fed to the shift register 330 to load the sixteen bit data word from the buffer register 340. V SHFT CLK is also fed to the buffer register request flip-flop 400 in FIG. 13. Since the SR LD H is TRUE, V SHFT CLK sets the buffer register request flip-flop and initiates a second buffer register request cycle. The second buffer register request memory cycle is eventually performed, resulting in a second BR DN at time T4 which causes the loading of a second modifier memory word into the buffer register 340, resets the buffer register request flip-flop 400 and increments the word counter 364 to indicate that the second word, word 1, has been stored in the buffer registers 340. At time T3, V SHFT CLK also resets the video start flip-flop 379. Consequently, when BR DN DLYH occurs a short time after time T4, a second video shift clock signal is not produced.

At time T5, the first video data bit appears at the output of the first delay stage 311. The function generator 320 operates on this first data bit based on the first bit output from the shift register 330. For clarity of illustration, the V D MOD P3H signal is shown as an unmodified, delayed version of VD P1H.

At time T6, the coincident HIGH states of the V D VLD P3H and V D VLD P4H signals produces the second V SHFT CLK signal. This signal clocks the shift register 330 to present the second bit therein to the function generator 320 and increments pixel counter 375. The function generator 320 operates on the second video data bit output from the delay stage 311 and the second modifier data bit output from the shift register 330 and provides a V D MOD H signal to the third delay stage 313.

Between times T6 and T7, fourteen additional V SHFT CLK signals are generated by the successive coincident HIGH states of V D VLD P3 and V D VLD P4H signals, each time clocking the pixel counter 375 and shifting the next modifier data bit from shift register 330 into the function generator 320. After sixteen data and modifier bits have been operated on the pixel counter 375 has counted 16 pixels and produces a carry out signal which in turn sends a SR LD signal to shift register 330 so that, upon the occurrence of the next V SHFT CLK pulse at time T7, the second data word in buffer registers 340 is loaded into the shift register 330. The first modifier data bit in the second word is thus presented at the output of the shift register 330 to the function generator to be operated on along with the seventeenth video data bit. In addition the coincidence of the seventeenth V SHFT CLK pulse and the SR LD signal causes the buffer register request flip-flop 400 to be set to initiate a third buffer register request memory cycle. Accordingly, at time T8 when BR DN occurs, the buffer registers 340 are loaded with the third modifier data word, word 2, and the word counter 364 is incremented, indicating that word 2 has been loaded into the buffer registers.

This sequence of counting sixteen V SHFT CLK pulses, followed by transfer of a modifier data word from buffer register 340 to shift register 330 and initiation of a new buffer register request memory cycle continues for up to sixteen modifier memory words. At the end of the last data bit from the camera interface (after delay in stage 311) an EOL P1H signal occurs as shown at time T9 in FIG. 16. The EOL P1H signal clocks the line counters 362 and 363 from line 0 to line 1. The EOL P1H signal also produces a LN ST signal which produces the same sequence of operations between times T9 and T14 as were produced by the ODD FR P P1H signal at between times T1 and T6. The only difference is that at time T1 the line counters were reset, but at time T9 the EOL P1H signal increments the line counter. In all other respects the sequence of operations is the same. This timing sequence continues for up to 256 lines of video data to complete a video frame.

It should be understood that this invention is not limited to the use of sixteen kilobit dynamic RAMs or to the use of sixteen bit modifier word transfers between modifier memory buffer registers and the shift register. The use of sixteen bit word transfers is convenient in the embodiment shown in FIGS. 8-14 because it provides a substantial time window when the memory circuitry is not required to service buffer register request cycles and during this time window the CPU in the image processing circuitry can be performing data read and write operations on planes of the modifier memory which are not being used for video data modification. In other versions of the invention using, for example, programmable ROMs or fixed ROMs as the modifier data memory, shorter words could be utilized in transfers between modifier memory the buffer register and the shift register. The only requirement is that the memory cycle time be short enough with respect to the word length that the memory control circuitry has time to read a modifier word into the buffer register well before that word is required to be loaded into the shift register for presentation to the function processor circuit.

Those skilled in the art of logic design will appreciate that there are other ways of implementing the pixel control logic circuit 370 to implement the same functions that are performed using the specific logic shown in FIG. 8.

The function generator 320 is a programmable function generator implemented using a multiplexer circuit having three multiplex control terminals A, B, and C and eight data inputs 0-7. Table I below is useful in explaining the operation of the multiplexor as a programmable logic function generator capable of selectably performing AND, OR, and XOR logic.

TABLE I

| VDP1H | FSEL0 | FSEL1 | INP NO. | INP. | INP. BIT | OP BIT | INN OP | FCT |
|---|---|---|---|---|---|---|---|---|
| 0 | 0 | 0 | 0 | P | 1 | 1 | 0 | VDP1H NO CHANGE |
| 1 | 0 | 0 | 1 | G | 0 | 0 | 1 | |
| 0 | 1 | 0 | 2 | P | 1 | 1 | 0 | VDP1H AND |
| 1 | 1 | 0 | 3 | MVH | 1 | 1 | 0 | |
|  |  |  |  |  | 0 | 0 | 1 | MV |
| 0 | 0 | 1 | 4 | MV | 1 | 1 | 0 | VDP1H OR |
|  |  |  |  | MV | 0 | 0 | 1 | |
| 1 | 0 | 1 | 5 | G | 0 | 0 | 1 | MVH |
| 0 | 1 | 1 | 6 | MV | 1 | 1 | 0 | VDP1H XOR |
|  |  |  |  |  | 0 | 0 | 1 | |
| 1 | 1 | 1 | 7 | MVH | 1 | 1 | 0 | MVH |
|  |  |  |  |  | 0 | 0 | 1 | |

Consider first the operation of the multiplexer when F SEL 1 and F SEL 2 signals are both logic 0. In this case, the logic value of the V D P1H signal input to terminal A controls the switching of the output of the multiplexer between the input terminal numbers 0 and 1. These input terminals have pull-up P (logic HIGH or 4) and ground G (logic LOW or 0) voltages, respectively. The multiplexer inverts the logic state at its output. Consequently, the 0 value for V D P1H selects data input terminal 0 having a bit value of 1 but producing an inverted output 0. Correspondingly, the V D P1H logic level 1 selects terminal 1 having logic 0 thereon which is inverted to a logic 1. Accordingly, with F SEL 0 and F SEL 1 both 0, the multiplexer 320 simply repeats the bit value of the V D P1H signal at its output.

The second function select condition is where F SEL 0 has a logic 1 and F SEL 1 has a logic 0. In this case the V D P1H signal selects between data inputs 2 and 3 with data input 2 having a P thereon and input number 3 having modifier video high M V H thereon. Accordingly, when VDP1H has a logic 0 value, the P input on terminal 2 is communicated to the output and inverted as a logic 0. When V D P1H is a logic 1, the inverted output of the multiplexer is a logic 0 if M V H is a logic 1 and a logic 1 if M V H is logic 0. Accordingly, the multiplexer 320 implements a logic AND function with the V D P1H input ANDed with M V L (because of the inversion). The logic AND function could easily be implemented for M V H by utilizing M V on the input terminal 3.

When F SEL 0 is in a logic 0 and F SEL 1 is in a logic 1, the V D P1H signal on terminal A selects between data input terminals 4 and 5. Data input terminal 4 has M V thereon and terminal 5 has ground G thereon. Accordingly, when V D P1H is logic 0, the inverted output of the multiplexer is either logic 0 if M V is logic 1 or logic 1 if M V is logic 0. If V D P1H is logic 1, then terminal 5 is selected and the inverted output is logic 1. The output of the multiplexer 320 thus constitutes a logic OR-ing of V D P1H and M V H.

When F SEL 0 and F SEL 1 are both logic 1, the V D P1H input selects between data input terminals 6 and 7. Input terminal 6 has M V on it and input terminal 7 has M V H on it. When V D P1H is logic 0, the inverted output of the multiplexor is logic 0 if M V is 1 or logic 1 if M V is 0. Correspondingly, if V D P1H is 1, the inverted output of the multiplexer is logic 0 if M V H is logic 1 and is logic 1 if M V H is logic 0. Accordingly, the multiplexor 320 implements the XOR function on inputs V D P1H and M V H. Basically the XOR function provides a logic 1 output when the two input bits have different logic values and a logic 0 when the two input bits have the same value.

It will be appreciated that the programmable logic function which the multiplexer 320 provides could also be implemented in normal arrangement of logic gates with the function select signals simply decoded to select the output of the appropriate gate for communicating to the video data modified output 321. It should also be apparent that either the multiplexer implementation of a programmable function generator or a static logic type of function generator could be expanded to implement additional function logic by utilizing additional function select bits. It should also be apparent that different logic functions could be implemented than those shown and described above simply by connecting different arrangements of the P, G, M V, and M V H signals to the data terminals. It should further be apparent that complementary logic versions of the V D P1 could be supplied to the data input terminals of the multiplexer with a single logic version of the M V signal coupled to the multiplexer control terminal A. However, since the shift register 330 already has complementary M V output signals available, it is convenient to connect the signals in the fashion shown in FIG. 9.

Figure 10:
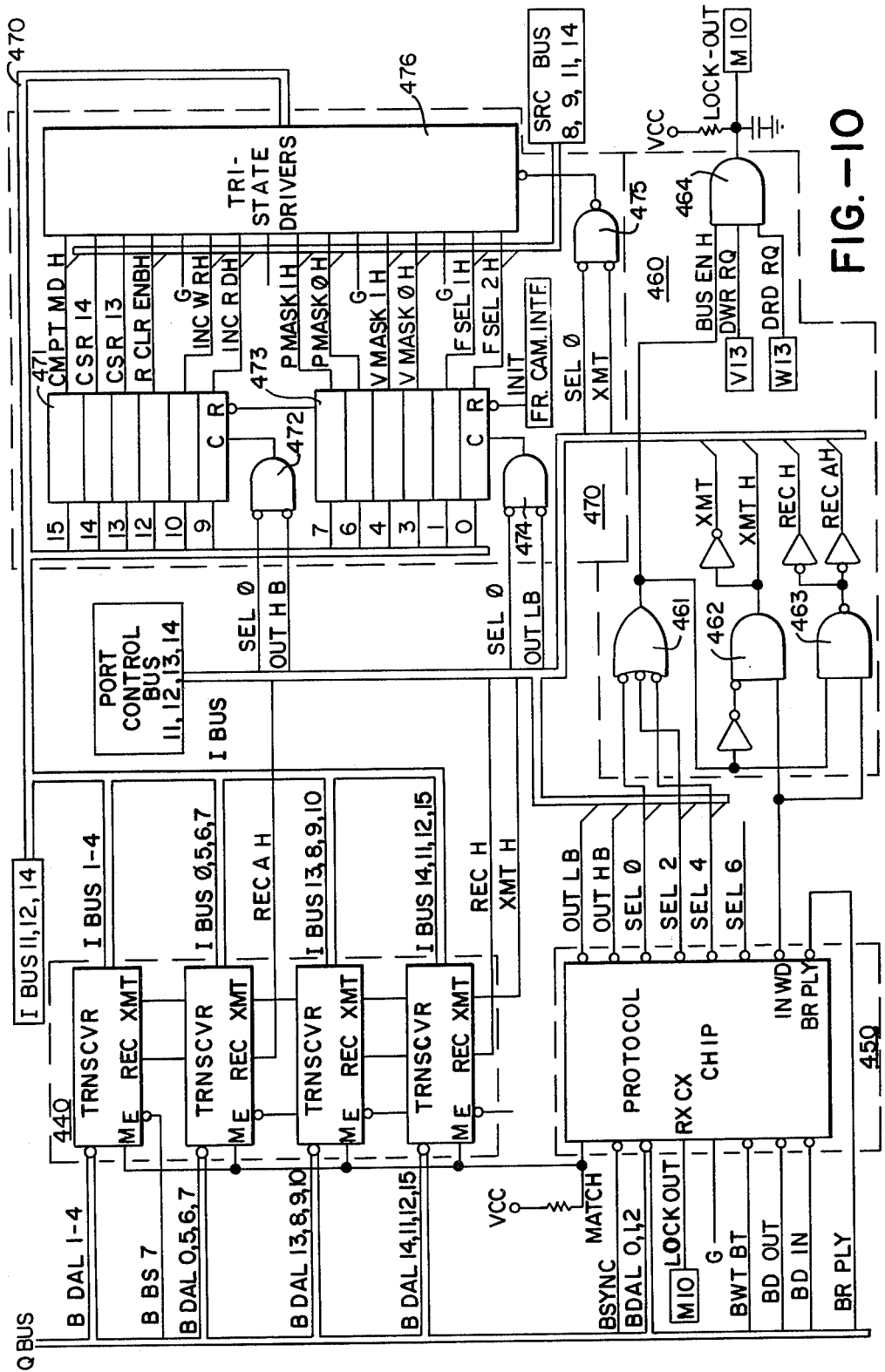

Referring now to FIG. 10, the basic programmable I/O port arrangement for enabling communication of address, data, and control information between a CPU and the image data modification system will be described. The particular I/O arrangement shown in FIG. 10 is for an LSI 11 microcomputer from Digital Equipment Corporation and utilizes what is called the Q-bus protocol. Implementing the Q-bus protocol involves the use of transceiver circuits 440 and a protocol chip 450. The transceiver circuits communicate between the data lines on the Q-bus and an internal bus called the I-bus. The bus data and address lines BDAL of the Q-bus carry multiplexed data and address information to and from the transceivers. The I-bus carries data in a bidirectional shared fashion to the status, address and memory data registers.

The protocol chip 450 receives certain BDAL signals from the Q-bus along with various control signals which determine the particular active I/O port and control signals which are true at the output of the protocol chip. The output signals from the protocol chip 450 are enabled by the MATCH signal from the transceiver chips 440, indicating that the I/O port addresses for this device are present on the BDAL signals. The output signals from the protocol chip are a out low byte signal (OUTLB), an out high bite signal (OUTHB), a select 0 signal (SEL 0), a select 2 signal (SEL 2), and a select 4 signal (SEL 4). The SEL 0, SEL 2 and SEL 4 signals are fed to gate 461 to produce a bus enable BUS EN signal. The BUS EN signal from gate 461 is fed to pair of gates 462 and 463 which also receive an input from the INWD terminal of protocol chip 450. This overall logic arrangement determines whether the I/O port is in transmit or receive mode. The transmit (XMT) and receive (REC and REC H) signals are fed back to the transceiver circuitry 440 to control the direction of transmission of data and address information between the I-bus and the Q-bus. The gate 464 provides a lockout signal to the protocol chip 450 to preclude it from acting on any new instructions from the CPU when the system is in the process of servicing either a data write request or a data read request.

The SEL 0, SEL 2, and SEL 4 outputs of the protocol chip determine the particular I/O function which is being called for by the CPU. As will be seen, the SEL 0 I/O port is functionally related to writing data into status registers and reading data from status registers in the status register circuitry 470 shown in FIG. 10. The SEL 2 signal is associated with the I/O control for writing address information into computer address circuitry 490, portions of which are shown in both FIGS. 11 and 14. The SEL 2 I/O port is also involved in reading address data back to the CPU. The SEL 4 signal is associated with CPU data write into the write register circuitry 530 shown in FIG. 12 and the CPU data read from data read register circuitry 550 shown in FIG. 12.

Consider first the functioning of the SEL 0 I/O port to write control information into the status register circuitry 470 shown in FIG. 10. As shown in FIG. 10 there are two sections of status register 471 and 473 each having six separate registers receiving six of the I bus signal lines. When SEL 0 is true and both OUT HB and OUT LB are true, the gates 472 and 474 clock the status register control bits on the I bus into the status registers 471 and 473. The CPU can verify the proper writing of status register control bits into the status registers by causing protocol chip 450 to output the SEL 0 signal and an XMT signal, enabling gate 475 to turn on the tri-state drivers 476 which place the outputs of the status registers 471 and 473 back on to the I bus. The transceivers are in a transmit mode so the status register output bits are transmitted back over the Q bus to the CPU for verification.

The bottom two registers in status register 473 contain the function select control bits FSEL OH and F SEL 4H which are placed on the status register control SRC bus and are communicated to the function processor circuit 320 in FIG. 9. The purpose of those two bits has already been explained. The next two status registers in block 473 contain high order video mask address bits V MASK 0H and V MASK 1H which are placed on the SRC bus and are communicated to the tristate drivers 361 in the pixel address circuitry 360 shown in FIG. 8 The top two registers in status register block 473 contain the P MASK 0H and P MASK 1H bits which are communicated on the SRC bus to the tristate drivers 494 in the computer memory address and control circuitry 490 shown in FIG. 11.

The V MASK 0H and V MASK 1H bits control which of the four modifier memory planes is addressed by the pixel address circuitry for reading out of the modifier memory 350 into the buffer register 340 and the shift register 330. The P MASK 0H and P MASK 1H bits control which of the modifier memory planes is being addressed by the computer address ciruitry 490A for either write or read operations.

The status register block 471 includes two status register sections INC RDH and INC WRH which contain control bits for controlling the auto increment of the computer address counters during a computer read or write operation on modifier memory 350. The status register block 471 also includes a control bit called a row clear enable R CLR ENBH which is used when a linear camera is employed and affects the resetting of the line counters in the pixel address control logic in FIG. 8. The status register block 471 contains two spare status register bits designated CSR 13 and CSR 14. It also includes a compatibility mode CMPT MDH register bit which contains a control bit which sets up compatibility mode logic circuitry as shown in FIG. 14 to enable the computer to perfrom either single word mode transfers to the data write and read registers or separate eight bit byte transfers to the data read and write registers. The purpose of the compatibility mode is to make it convenient for the CPU to control the transfer of image data from the image buffers directly to and from the data read and write registers. In the VS 100 Machine Vision System, the image buffers utilize eight bit byte transfers and the compatibility mode makes it easier for the software to control transfer of data between the image buffers and the modifier memory planes.

Figure 11:
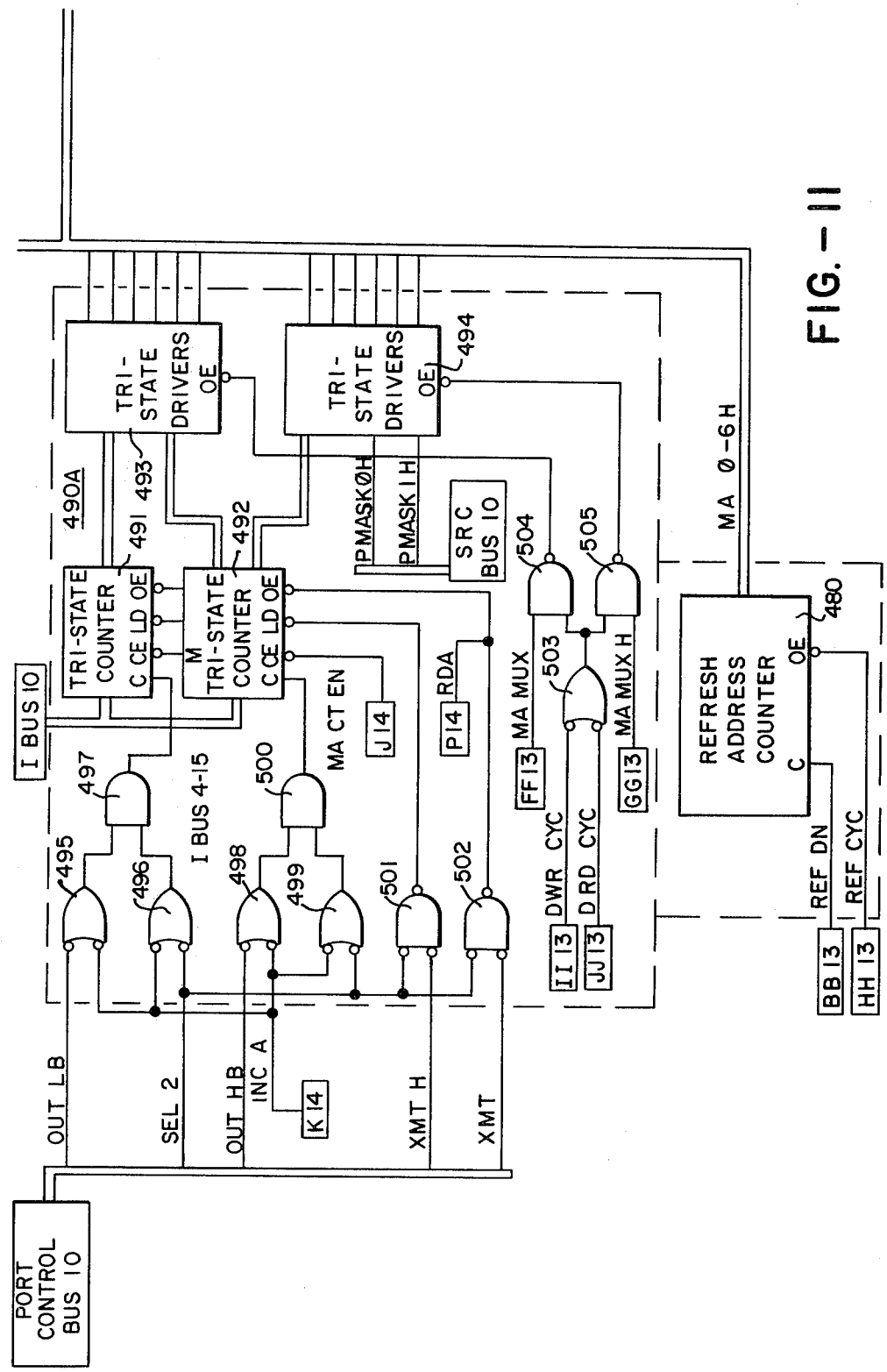

Consider now the functional operation of the circuitry shown in FIG. 10 and FIG. 11 to write an address into the computer address counters 491 and 492 in FIG. 11, and also into the A3 flip-flop shown in FIG. 14. When SEL 2 is true and XMT is false gate 501 is enabled and provides a load signal to the tri-state address counters 491 and 492. Consequently, the address data on I BUS 4-15 are loaded into the tri-state counters 491 and 492 clocked by the OUT LB and OUT HB signals through gates 495, 497, 498 and 500. At this time SEL 2H and OUT LBH are both true in FIG. 14, providing enabling signals to one or the other of the gates 506 and 507 depending on the bit value on I BUS 3H. Accordingly, the bit value on I BUS 3H determines whether the A3 flip-flop 508 is set or reset. As will later be seen, the A3 flip-flop only comes into play when the system is in a compatibility mode and eight bit byte transfers are being utilized instead of sixteen bit word transfers.

If the CPU wishes to read out the address value currently stored in the tri-state counters 491 and 492, it sets SEL 2 low and XMT low, enabling gate 502 to place an out enable signal on tri-state counters 491 and 492 and causing the stored count state to be placed on the I BUS 4-15 to be transmitted through the transceiver circuitry 440 in FIG. 10, onto the Q-bus to the CPU. The RD A signal from gate 502 (FIG. 11) also enables tri-state drivers 509 (FIG. 14) to place the value of A3 on I BUS 3 and force I BUS 0-2 low.

Consider now the operation of the circuitry in FIGS. 10, 11, 12 and 13 to perform a sixteen bit data write to the modifier memory 350. It is assumed that the computer has already set up the address in the tri-state counters 491 and 492 for the particular location in modifier memory 350 which is desired to be written into. This includes having set the P MASK 0 and 1 registers in the status register circuit 470 in order to set the two highest bits of address to the modifier memory 350. First consider a data write cycle without auto increment. To implement this, the increment write status register is set by the CPU to a 0 value so the output of gate 512 in FIG. 14 is disabled. Also since a write cycle utilizing a 16 bit word transfer is to be implemented, the compatibility mode register bit is set to logic 0 which causes the Gate 522 to have a low output signal HI BY EN. This enables the logic gate 564 to respond to a D WR CYC signal to produce a M LO WR EN signal supplied to the output enable terminal of write register low 531 in FIG. 12 and to the write enable (WE) terminal of modifier memory section 351. The HI BY EN signal also disables the gate 544 in FIG. 12 preventing a D WR CYCH signal from enabling the out enable terminal of write register SWAP 532 in FIG. 12.

To initiate the data write cycle, assuming the CPU has already set up the address for the data to be written into, the computer will set the SEL 4 output of the protocol chip TRUE along with the OUT LB and OUT HB signals. Referring to the data write logic circuitry 540 in FIG. 12, it is seen that the coincident true states of OUT HB and SEL 4 and OUT LB and SEL 4 enable both gates 543 and 545 producing both a load high data LD HI DH and load low data LD LO DH signal, both of which are fed to gate 393 in FIG. 13 at the input of the data write request flip-flop 394. Accordingly, these signals set the data write flip-flop 394 and produce a D WR RQ signal to the memory request latches 411. In addition, the LD LO DH and LD HI DH signals clock the sixteen data bits on I-BUS 0-15 into the write register high 533 and the write register low 531 (eight bits each). The lower eight bits of data are also clocked into the write register swap 532 but its out enable (OE) input cannot be activated because of the status of HI BY EN at the input to gate 544.

When the memory request latch and priority encode circuitry determines that the data write request should be serviced, a D WR CYC signal is generated at the output of cycle select decode circuit 421 followed by the appropriate sequence of signals out of memory sequencer 430. The D WR CYC signal at the input to gate 564 in FIG. 14 and to gate 542 in FIG. 12 produce out enable (OE) signals to the write register low 531 and write register high 533, causing the data written therein to be presented on the memory data busses at the inputs to modifier memory 350. After the memory sequencer outputs its column and row address strobe signals, the data presented from the write register high 533 and the write register low 531 is written into the addressed section of the modifier memory 350.

Consider now the operation of the circuitry if an auto increment of the address register circuitry 490A is to be performed after each write cycle. In this case the increment write INC WRH status bit in status register 471 is set to a logic 1 or TRUE state. Consequently, at the end of the data write cycle when D WR DN signal becomes TRUE at the input of gate 512 in FIG. 14, an increment address INC A signal is produced. This INC A signal is fed to gates 395 and 396 in FIG. 13 and to gates 495, 496, 498 and 499 in FIG. 11. The INC A signal produces a clock input to the tri-state address counters 491 and 492, causing them to increment one count.

It should be noted that, at the time that the address was set up for the data write cycle, a data read request was initiated by the logic at the input to the data read request flip-flop 398 in FIG. 13 i.e. by the combination of SEL 2 and OUT HB and OUT LB. This causes the data at that addressed memory location to be read into the read register 550 at the end of the data read request cycle when D RD DN goes high to clock the data into the read registers 550. Similarly, a data read request cycle is initiated when the INC A signal is produced at the end of a data write cycle. This is shown by the feeding of INC A signal to the gates 395 and 396 in FIG. 13. Accordingly, after the data read request has been serviced by the memory control circuitry, the data at the new address in the tri-state counters 491 and 492 is loaded into the read registers at the end of the data read cycle. The data is then available for the computer to initiate a read data cycle if it wants to look at the data in that addressed memory location to determine whether it should be changed or not.

Consider now the operation of the system when the compatibility mode status bit has been set so that eight bit byte transfers are to occur. If a sixteen bit word is to be transferred in two successive eight bit write operations, it is necessary that the increment write INC WR H also be set TRUE or the CPU must perform two memory address write operations to the address registers and the A3 flip-flop 508 since the A3 flip-flop 508 controls both the logic level of the memory address count enable M A CT EN signal and the input to gate 522 which determines the status of high byte enable signal HI BY EN. In turn, this enables alternate pulsing of the out enable (OE) terminals of the write register low 531 and the write register SWAP 532 in successive data write cycles for each of the individual eight bits. Accordingly, although each time an eight bit byte is written into the registers, it is loaded into both registers 531 and 532, the first eight bit byte is output on the first data write cycle from the write register low 531 to the lower order eight bits of the modifier memory 350. On the second data write cycle, after the second eight bit byte has been written into the low and swap write registers, the increment address signal INC A or a new address write from the CPU has changed the state of the A3 flip-flop 508 so that the second data write signal enables the output of the write register swap 532 only.

The A3 flip-flop also controls the logic value of the memory address count enable M A CT EN signal so that the INC A signal (if in auto increment mode) which occurs after each data write cycle has been completed only causes an incrementing of the tri-state address counters 491 and 492 in FIG. 11 after the second write cycle has occurred. This keeps the memory address the same for the first and second write cycles for sequential writing into proper memory locations of the first eight bit byte and the second eight bit byte from the write register low 531 and write register swap 532, respectively.

It should be understood that in the compatability mode, it is possible to perform single eight bit transfers to any memory address location by writing address data into the address counters 491, 492 and the A3 flip-flop and then writing an eight bit data word into the write register low 531 and write register swap 532. The A3 bit value controls whether the output of the data write swap or data write low register is enabled to write the eight bit word into the appropriate addressed memory location.

Referring to FIG. 14, the data read logic 560 enables the computer to read the data in the read registers when the SEL 4 signal is true and the XMT signal is true. This produces a read data high RD DH signal at the output of gate 561 which in turn produces a RD LO D and a RD D signal to the read register low 553 and the read register high 557 in FIG . 12.

The read mode may be accomplished in an eight bit byte transfer again utilizing the compatibility mode with the A3 flip-flop controlling the successive feeding of output enable (OE) signals to the read register low 553 and the read register SWAP 552 in successive computer generated read cycles.

Another operation which must be performed on modifier memory 350 when dynamic RAMS are used in the memory is a refresh of the memory contents. This must happen at regular intervals to avoid loss of the data which is stored in capacitor structures within the memory. To accomplish the refresh operation, a refresh timer 391 in FIG. 13 periodically sets the refresh request flip-flop 392 to produce a REF RQ signal to the memory encode and control circuitry 410. This REF RQ signal will be serviced as the lowest priority request, but a refresh cycle will be performed when the memory cycle control circuitry is not busy servicing other read and write requests. The refresh address counter 480 in FIG. 11 keeps track of the next address within the dynamic RAM memory to be refreshed. The output of the refresh address counter 480 is enabled when the REF CYC signal goes TRUE at the output of the cycle select decode circuit 421 in FIG. 13. When the REF DN signal occurs, the refresh address counter 480 is clocked to the next count so that the next row of the memory will be refreshed when the next refresh memory cycle occurs. The refresh address counter 480 puts out only seven address bits since all of the columns in a single row of memory are simultaneously refreshed. The refresh cycle of the dynamic RAM involves setting up the address for the particular row, after which the data in the memory is automatically output on the memory data lines and fed back to the memory so that a write-after-read operation is performed. This same write-after-read operation is performed anytime any section of the memory is addressed, but the refresh cycle assures that each section of the memory is refreshed often enough to maintain the data stored. It should be understood that other types of random access memories could be utilized such as fast static random access memories. In that case a refresh cycle is not required since a static random access memory stores data in bistable devices.

Although the above description of the computer I/O interface circuitry for control address and data signals given above is specifically for the LSI 11 microcomputer, it should be understood that the same functions could readily be implemented using other microcomputers from other manufacturers. The specific programmable I/O functions would be implemented differently utilizing the particular I/O interface chips which are compatible with the particular bus protocol of the other CPU systems. The important common functions that would be employed are the provision of one I/O port for reading information into the status registers, the provision of a second I/O port for reading address information into the computer access address counters and the provision of a third selectable I/O port for reading and writing data to the read and write registers. Depending on the I/O port protocol, it may be necessary to utilize separate I/O ports for the read and write data and may also require separate I/O ports for the writing and reading of address signals, if bidirectional I/O ports are not available as part of the interface protocol for the CPU. However, the control logic and other aspects of the circuitry could reamin the same since in every case the I BUS, PORT CONTROL BUS and SRC BUS functions could be implemented using other I/O protocols with other CPU's.

Referring now to FIGS. 17-19, some examples of the utilization of the AND, OR and XOR functions of the system depicted in FIGS. 8-14 will be described. FIG. 17 illustrates the use of the AND function in a part inspection application in which it is desired to determine whether the geometric position of various aspects of the part fall within a particular geometric tolerance zone. In the particular case shown in FIG. 17A a multi-pin connector 600 is depicted with the individual pins 601 showing as black areas of the video image. In this case the image labelled MASK in FIG. 17B mask is stored in the modifier memory and each of the darkened circles 611 represents a tolerance zone on the associated connector pin. A tolerance zone 612 may also be provided for the housing 602 of the connector. Any fixturing for the part to hold it in registered position in the camera field of view could also be windowed out using a mask region for the fixture corresponding to the fixture geometry. Utilizing the system of this invention with the programmable function generator set to the AND function as previously described, the individual pixel data bits from the video image of FIG. 17A will be ANDed in the function generator with data bits corresponding to the inversion of the mask 610 shown in FIG. 17B. Consequently, any black pixel in the video data image which falls within a black region of the mask 610 will be converted to a white pixel and will not be seen in the resultant VID AND —MASK image in FIG. 17C. As shown in FIG. 17C, a portion of the image pixels corresponding to the connector pin 603 are black since a portion of the image of the pin 603 in FIG. 17A lies outside of the particular mask tolerance zone 613 in FIG. 17B. It is thus seen that the VID AND —MASK image shows only any portion of the part which is out of tolerance and this modified image may be used to analyze the area of the part in which the variation occurred. It may be possible to establish accept/reject criteria simply on the basis of whether any substantial number of black pixels remain in the final modified image. This assumes, of course, that the final modified image does not contain a substantial number of black pixels due to noise in the image data.

FIG. 18 illustrates another use of the system of this invention to eliminate from a scene complex image detail which is irrelevant to the inspection task to which the system is applied. In this case the object 620 to be inspected is a jar or bottle having a label 621 with writing thereon. The inspection task is to determine the presence and proper position of the label on the can. Accordingly, the lettering on the label is immaterial to the inspection task. However, the presence of the lettering image data in the label drastically affects the image processing time since each of the segments of the lettering must be processed through the run-length encoding process followed by processing through the image analysis algorithms that are employed. Using the system of this invention the immaterial detail in the video image can be masked out by loading the modifier memory with data which corresponds to a region of the video image which is to be eliminated, in this case the region emcompassing the lettering of the label 621.

Utilizing the programmable function generator in the OR mode the black region 631 in the mask 630 will be seen in the final image 630 along with the outline 642 corresponding to the outline of the label 622 in the original video image. The final modified image 640 is greatly simplified from an image analysis standpoint and can be processed much more quickly to determine the presence and correct positioning of the label 621.

FIG. 19 illustrates an application of the system of this invention utilizing the XOR function in the function logic processor. In this case, the inspection task is to determine the degree of correspondence between a standard part geometry which is a known good part and individual test parts which are to be inspected by the system. In this case, to generate the modifier memory plane corresponding to the mask, a first video image corresponding to the standard part may be taken and accumulated in the image buffer and then transferred by the CPU into a preselected modifier memory plane. Then an image of the test part positioned within the field of view of the camera in the same location is taken and each pixel in the VIDEO 2 image is XORed with the data in the modifier memory corresponding to the VIDEO 1 image to determine whether a bit value correspondence exists. For each pixel where the bit value in the VIDEO 2 image is different from the bit value in the VIDEO 1 image, the resultant VIDEO 2 XOR MASK image will show a black pixel.

The particular example shown in FIG. 19A is a simplified schematic image of a lead frame part which might be used in the semiconductor industry. In this case the lead frame part may be very small and may be imaged using a magnifying lens or miscroscope arrangement. As shown in FIG. 19A the standard part 650 has a regular lead geometry whereas the test part 660 in FIG. 19B has some portions of the leads missing or bent out of position in varying degrees. For example, a portion of lead 651 in FIG. 19A is missing in the image of the corresponding lead 661 in FIG. 19B. Similarly, the VIDEO 2 image shows that the leads 662, 663 and 644 are bent out of position compared to the image of the corresponding leads 652, 653 and 654 in FIG. 19A. The modified video image shown in FIG. 19C contains black pixels only where the VIDEO 2 image shown in FIG. 19B differs from the VIDEO 1 image shown in FIG. 19A. Accordingly, the final image 670 contains a black pixel region 671 corresponding to the area of the lead 661 in the VIDEO 2 image which is missing. The black region 672A in the image 670 corresponds to the portion of the image of the lead 652 in the VIDEO 1 (MASK) image data which is not present in the lead 662 in the image 660. The black region 672B corresponds to the portion of the image of lead 662 in FIG. 19B which is not present in the image of the lead 652 in FIG. 19A.

Similarly, the two sections of the black region 673 in FIG. 19C corresponds to the discrepancies between the lead images 653 and 663 in FIGS. 19A and 19B, respectively. Also the black regions 674 in the modified image data plane 670 shown in FIG. 19C correspond to the differences between the lead image 654 in FIG. 19A and the lead image 664 in FIG. 19D.

It should be understood that the AND function shown in FIG. 17 could also be used for this differencing function with the VIDEO 2 data ANDed with an inverted version of the MASK data image of FIG. 19A. In this case, the modified image would contain only the portions of the VIDEO 2 data which do not fall within the black pixel regions of the MASK shown in FIG. 19A.

These applications of the image data modifier system of this invention are given by way of example only should not be construed to be a limitation on the application of the system and method of this invention. Specifically, it should be understood that the principles of this invention could be applied in a system in which two image data modifiers are positioned in tandem with a first image data modifier producing a modified video data stream in accordance with one programmable function processing operation carried out on the original video data followed by a second programmable function processing operation on the modified video data stream. It should further be understood that the original video data stream could be processed through two image data modifier arrangements in parallel to simultaneously generate two modified video data streams in parallel to be stored in two separate image buffers or to be otherwise processed separately. Furthermore, it should be understood that various combinations of function processing operations could be carried out to do more complex logic processing of original and modified video images if desired. Finally, it should be understood that imaging means other than video cameras could be used and the invention is applicable to any imaging means which produces a serial image data stream.

What is claimed is:

1. In an image data processing system, in combination:

imaging means for producing a serial image data stream corresponding to an array of pixels having a preselected relationship to a scene viewed thereby and producing a separate format signal stream accompanying said image data stream;

image data modification means including multistage digital delay means for separately delaying said image data stream and said accompanying format signal stream in a synchronous manner, means for withdrawing at least a portion of said image data stream from at least one stage of said delay means, means for processing said withdrawn image data stream portion in accordance with a preselected algorithmic function to produce a modified image data stream, and means for reinserting said modified image data stream into a subsequent stage of said delay means; and image utilization means coupled to said image data modifier means for utilizing said modified image data stream.

2. The system of claim 1, wherein said processing means includes a function processor receiving said withdrawn image data stream and adapted to process said data stream together with at least a second data stream in accordance with a preselected algorithm to produce said modified image data stream, and a modifier data source for supplying a modifier data stream to said function processor in synchronism with said image data stream.

3. The system of claim 2, wherein said imaging means produces an image data stream comprising successive data words of n bit length, each data word corresponding to an image pixel; and said modifier data source comprises memory means storing a plurality of preselected modifier data words each associated with one of said image data words and means for reading said modifier data words out of said memory means and presenting said modifier data words said function processor in synchronism with the arrival of associated image data words.

4. The system of claim 3, wherein n=1, and said memory means comprises at least one random access memory means, and said reading and presenting means comprises buffer storage means coupled to said memory means for receiving and storing a word of said modifier data; a shift register coupled to buffer storage means for receiving a word of modifier data therefrom and communicating successive bits of said modifier data word to said function processor one at a time; address circuit means for addressing said memory to read out a word therefrom into said buffer storage means; and control circuit means receiving at least one format signal for controlling said address circuit means, said buffer register means and said shift register means to present successive modifier data bits to said function processor in synchronism with corresponding bits of said image data stream presented thereto.

5. The system of claim 3, wherein n is greater than 1, said function processor is adapted to process first and second data streams comprising successive n and m bit words, respectively, in accordance with a preselected algorithm; and said memory means comprises m random access memory means, each storing one bit of each m bit word in said modifier data stream; and said reading and presenting means comprises a separate buffer storage means coupled to each of said random access memory means for receiving and storing a word of said modifier data therefrom; a shift register coupled to each of said buffer storage means for receiving a word of modifier data therefrom and communicating successive bits of said word to said function processor one at a time; address circuit means for addressing each of said memories simultaneously to read out a word therefrom into associated buffer storage means; and control circuit means receiving at least one format signal for controlling said address circuit means, each of said buffer register means, and each of said shift register means to present successive modifier bits to said function processor in synchronism with corresponding bits of said image data stream.

6. The system of either claim 4 or 5, wherein said image data stream is a video data stream organized as a rectangular array of pixels having y lines of x pixels each, and said format signal streams includes at least a frame start pulse on a first format data line preceding the first row of pixel data and an end of line signal substantially coincident with the last pixel in each line; each said random access memory means is organized as s words of r bits each, r being substantially greater than the memory cycle time of said random access memory means multiplied by the pixel frequency, and s being a sufficiently high value to store an entire modifier memory plane corresponding to a complete video frame; said address circuit means comprises a word counter and a line counter each having their outputs coupled as address lines into each of said memory means; and said control circuit means comprises a pixel counter incremented by video shift clock pulses, means for resetting said line counter in response to each frame start signal, means for resetting said word counter and said pixel counter in response to each frame start signal and each end of line signal, means initiated by each frame start signal and each end of line signal for generating a sequence of a first memory read cycle, a buffer register load and word counter increment pulse and coincident shift register load and video shift clock pulse prior to the arrival of the first pixel data word at said function processor; means for supplying a sequence of video clock pulses timed to shift said shift register and increment said pixel counter substantially coincident with the arrival of the second and subsequent pixel data words at said function processor; means for generating a sequence of a second memory address cycle and a buffer register load and word counter increment pulse prior to the occurrence of the rth video shift clock pulse; and means initiated by a carry out signal from said pixel counter after each rth video shift clock pulse for generating a sequence of a shift register load signal, a memory read cycle, and a buffer register load and word counter increment pulse.

7. The system of claim 6, wherein said memory means includes a plurality of modifier memory data planes each having modifier data corresponding to each pixel in said video data stream, and said address circuit means includes at least one settable memory plane address register for supplying at least one selectable memory address bit to said memory means for selecting one of said modifier memory planes to be read out from said memory means.

8. The system of claim 2, wherein said function processor is a programmable function processor adapted to process said video data stream and said second data stream in accordance with one of a plurality of selectable algorithms, and said system further includes function select means for selecting one of said algorithms for active implementation by said programmable function processor.

9. The system of claim 2, wherein n=1 and said function processor is a programmable function processor and comprises a multiplexer having a plurality of multiplexing control terminals and a plurality of data input terminals, one of said multiplexor control terminals receiving either said image data stream of said modifier data stream and the other of said multiplexing control terminals receiving function select signals; said data input terminals receiving an arrangement of ground and pull-up voltages together with at least one logical version of the other of said image data stream and said modifier data stream, said arrangement being predetermined such that the output of said multiplexer is one of a plurality of logic functional combinations of said image data stream and said modifier data stream selectable by said function select signals.

10. In an image data processing system, in combination; imaging means for producing a serial image data stream corresponding to an array of pixels in a scene viewed thereby;

image data modification means including a source of a modifier data stream and a function processing means receiving said modifier data stream and said video data stream for processing both said data streams in real time in accordance with a preselected algorithm to produce a modified image data stream; and image utilization means coupled to said image data modifier means for utilizing said modified video data stream.

11. The system of claim 10, wherein said imaging means produces a video data stream comprising successive data words of n bit length each corresponding to an image pixel; and said modifier data source comprises memory means storing a plurality of preselected modifier bits, each associated with one of said data words in said video data stream, and means for reading said modifier data bits out of said memory and presenting said modifier bits to said function processing means in synchronism with the arrival of said associated data words of said video data stream.

12. The system of claim 11, wherein n=1, and said imaging means also produces a separate format signal stream accompanying said image data stream; said memory means comprises at least one random access memory means; and said reading and presenting means comprises buffer storage means coupled to said memory means for receiving and storing a word of said modifier data; a shift register coupled to buffer storage means for receiving a word of modifier data therefrom and communicating successive bits of said modifier data word to said function processor one at a time; address circuit means for addressing said memory to read out a word therefrom into said buffer storage means; and control circuit means receiving at least one format signal for controlling said address circuit means, said buffer register means and said shift register means to present successive modifier data bits to said function processor in synchronism with corresponding bits of said image data stream presented thereto.

13. The system of claim 11, wherein n is greater than 1, and said imaging means also produces a separate format signal stream accompanying said image data stream; said function processor means is adapted to process first and second data streams comprising successive m and n bit words, respectively, in accordance with a preselected algorithm; and said memory means comprises m random access memory means, each storing one bit of each m bit word in said modifier data stream; and said reading and presenting means comprises a separate buffer storage means coupled to each of said random access memory means for receiving and storing a word of said modifier data therefrom; a shift register coupled to each of said buffer storage means for receiving a word of modifier data therefrom and communicating successive bits of said word to said function processor one at a time; and address circuit means for addressing each of said memories simultaneously to read out a word therefrom into associated buffer storage means; and control circuit means receiving at least one format signal for controlling said address circuit means, each of said buffer register means, and each of said shift register means to present successive modifier bits to said function processor in synchronism with corresponding bits of said image data stream.

14. The system of either claim 12 or 13, wherein said video data stream is a video data stream organized as a rectangular array of pixels having y lines of x pixels each, and said format signal streams includes at least a frame start pulse on a first format data line preceding the first row of pixel data and an end of line signal substantially coincident with the last pixel in each line; each said random access memory means is organized as s words of r bits each, r being substantially greater than the memory cycle time of said random access memory means multiplied by the pixel frequency, and s being a sufficiently high value to store an entire modifier memory plane corresponding to a complete video frame, said address circuit means comprises a word counter and a line counter each having their outputs coupled as address lines into each of said memory means; and said control circuit means comprises a pixel counter incremented by video shift clock pulses, means for resetting said line counter in response to each frame start signal, means for resetting said word counter and said pixel counter in response to each frame start signal and each end of line signal, means initiated by each frame start signal and each end of line signal for generating a sequence of a first memory read cycle, a buffer register load and word counter increment pulse and coincident shift register load and video shift clock pulses prior to the arrival of the first pixel data word at said function processor; means for supplying a sequence of video shift clock pulses timed to shift said shift register and increment said pixel counter substantially coincident with the arrival of the second and subsequent pixel data words at said function processor; means for generating a sequence of a second memory read cycle and a buffer register load and word counter increment pulse prior to the occurrence of the rth video shift clock pulse; and means initiated by a carry out signal from said pixel counter after each rth video shift clock pulse for generating a sequence of a shift register load signal, a memory read cycle, and a buffer register load and word counter increment pulse.

15. The system of claim 14, wherein said memory means includes a plurality of modifier memory planes each having modifier data corresponding to each pixel in said video data stream and said address circuit means includes at least one settable memory plane address register for supplying at least one selectable memory address bit to said memory means for selecting one of said modifier memory planes to be read out from said memory means.

16. The system of claim 10, wherein said function processor is a programmable function processor adapted to process said video data stream and said second data stream in accordance with one of a plurality of selectable algorithms, and said system further includes function select means for selecting one of said algorithms for active implementation by said programmable function processor.

17. The system of claim 10, wherein n=1 and said function processor is a programmable function processor and comprises a multiplexer having a plurality of multiplexing control terminals and a plurality of data input terminals, one of said multiplexor control terminals receiving either said video data stream or said modifier data stream and the other of said multiplexing control terminals receiving function select signals; said data input terminals receiving an arrangement of ground and pull-up voltages together with at least one logical version of the other of said video data stream and said modifier data stream, said arrangement being predetermined such that the output of said multiplexer is one of a plurality of logic functional combinations of said video data stream and said modifier data stream selectable by said function select signals.

18. The system of either claim 6 or 14, wherein said image utilization means includes a programmable central processor unit having a preselected bus protocol for input/output ports; and said system further comprises: processor address means for addressing said random access memory means, including a processor address register and a processor selectable address port circuit for communicating address signals from said processor to said processor address register; and processor read and write means for writing data into and reading data from said random access memory means, including write register means coupled to said random access memory means, read register means coupled to said random access memory means, a processor selectable read/write port circuit means for communicating data from said processor to said write register means and for transmitting data from said read register means to said processor, and read/write control circuit means responsive to signals from said processor via said read/write port circuit to initiate either a memory read or a memory write cycle.

19. The system of claim 18, wherein said function processor is a programmable function processor adapted to respond to at least one input control bit to process said video data stream and a modifier data stream in accordance with one of a plurality of selectable algorithms; said memory means is adapted to store a plurality of modifier data planes; and said system further comprises: status register means for supplying at least one function processor select bit to said programmable function processor, at least one video mask address bit to said pixel address circuit means and at least one processor mask address bit to said processor address register, said status register means including a plurality of status registers and a processor selectable status register port circuit for communicating status register data from said processor to said status registers.

20. The system of claim 19 adapted to selectably write data to, and read data from, said random access memory in a word mode involving R bit transfers or a compatability mode involving r/2 bit transfers and to selectably autoincrement said processor address register during a processor controlled read or write cycle in either said word mode or said compatability mode, wherein said processor address register is a tristate counter; said processor address means further includes control logic responsive to an increment address signal to automatically increment said process address register to the address of the next modifier data word, and a separate additional single address bit storage means and control logic coupled to said address port circuit for writing an address bit into said single address bit storage means; said processor read and write means includes an r line data bus communicating between said read and write register means and said read/write port circuit means; said write register means includes a write register high adapted to receive and store the high r/2 bits of a modifier memory word from the high r/2 lines of said r line data bus and to communicate said high r/2 bit to the high r/2 memory data lines of said random access memory in response to a high write out enable command, a write register low adapted to receive and store the lower r/2 bits of a modifier memory word from the low r/2 lines of said r line data bus and to communicate said low r/2 bits to the low r/2 memory data lines of said random access memory in response to a low write out enable command, and a write register swap adapted to receive and store the high r/2 bits of a modifier memory word from the low r/2 lines of said r line data bus and to communicate said high r/2 bits to the high r/2 memory data lines of said random access memory in response to a swap write out enable command, said read register means includes a read register high adapted to receive and store the high r/2 bits of a modifier memory word from the high r/2 memory data lines of said random access memory and to communicate said high r/2 bits to the high r/2 lines of said r line data bus in response to a high read out enable command, a read register low adapted to receive and store the lower r/2 bits of a modifier memory word from the low r/2 memory data lines of said random access memory means and to communicate said low r/2 bits to the low r/2 lines of said r line data BUS in response to a low read out enable command, and a read register swap adapted to receive and store the high r/2 bits of a modifier memory word from the high r/2 memory data lines of said random access memory means and to communicate said high r/2 bits to the low r/2 lines of said r line data bus in response to a swap write out enable command; said read/write control circuit means includes logic circuit means responsive to a compatibility mode signal of one logic value to produce only low write out enable and high write out enable commands during a processor controlled write cycle and to produce only low read out enable and high read out enable signals during a processor controlled read cycle, said logic circuit means being further responsive to a compatibility mode signal of a second logic value to produce alternate low write out enable and swap write out enable signals depending on the logic value of said stored single address bit during a processor controlled write cycle and to produce alternative low read out enable and swap read out enable signals depending on said stored single address bit value during a processor controlled read cycle; and said system further includes autoincrement logic circuit means responsive to an autoincrement read or autoincrement write signal during processor controlled read or write cycles to generate said increment address signal at the beginning of a read cycle or the end of a write cycle, and compatibility mode/autoincrement logic means including logic circuit means for deriving an address count enable signal for said processor address registers from a logic combination of the bit value of said compatibility mode signal and the bit value stored in said single address bit storage means to enable memory address count incrementing of said processor address register on receipt of each increment address signal when said system is in said word mode and to enable memory address circuit incrementing only on receipt of every other increment address signal when said system is in said compatibility mode.

21. In a method for real time processing of a serial image data stream comprising an array of pixels and having an accompanying separate format signal stream, the steps of:
  separately delaying in multiple stages said image data stream and said format signal stream in a synchronized manner;
  withdrawing at least a portion of said image data stream from at least one of said delay stages;
  processing said withdrawn image data stream according to preselected algorithmic function to produce a modified image data stream; and
  reinserting said modified image data stream into a data signal path in parallel with and synchronous to associated delayed format signals.

22. In a method for real time processing of a serial image data stream comprising an array of pixel data words or bits and having an accompanying separate format signal stream, the steps of:
  delaying in separate synchronized digital delay stages said image data stream and said format signal stream;
  withdrawing at least a portion of image data stream from at least one of said delay stages;
  deriving a modifier data stream time synchronized with said image data stream;
  processing said withdrawn image data stream and said modifier image data stream according to a preselected algorithmic function to produce a modified image data stream; and
  reinserting said modified image data stream into a data signal path in parallel with and synchronized to associated delayed format signal in a delayed format signal stream.

* * * * *